(12) United States Patent
Adams et al.

(10) Patent No.: US 7,038,424 B2
(45) Date of Patent: May 2, 2006

(54) METHOD AND APPARATUS FOR REJUVENATING FUEL CELLS

(75) Inventors: William A. Adams, Kemptville (CA); Christopher L. Gardner, Dunrobin (CA); James H. Dunn, Embrun (CA); Ron Vered, Ottawa (CA)

(73) Assignee: Estco Battery Management Inc., Nepean (CA)

( * ) Notice: Subject to any disclaimer, the term of this patent is extended or adjusted under 35 U.S.C. 154(b) by 420 days.

(21) Appl. No.: 10/439,170

(22) Filed: May 16, 2003

(65) Prior Publication Data
US 2003/0211372 A1    Nov. 13, 2003

Related U.S. Application Data

(63) Continuation-in-part of application No. 10/108,491, filed on Mar. 29, 2002, now abandoned.

(30) Foreign Application Priority Data
Mar. 28, 2003   (WO) ............... PCT/CA03/00448

(51) Int. Cl.
*H01M 10/46*   (2006.01)
(52) U.S. Cl. ......................... 320/101; 429/22
(58) Field of Classification Search ......... 320/101, 320/116, 130, 131, 134, 136; 324/434, 438; 429/12, 13, 14, 22
See application file for complete search history.

(56) References Cited

U.S. PATENT DOCUMENTS

| | | | |
|---|---|---|---|
| 3,471,337 A | | 10/1969 | Fetterman |
| 4,484,140 A | * | 11/1984 | Dieu ................ 320/136 |
| 4,910,099 A | | 3/1990 | Gottesfeld |
| 6,096,448 A | | 8/2000 | Wilkinson |
| 6,096,449 A | | 8/2000 | Fuglevand |
| 6,210,820 B1 | | 4/2001 | Knights et al. |
| 6,339,313 B1 | | 1/2002 | Adams |
| 2001/0028966 A1 | | 10/2001 | Knights et al. |
| 2001/0044040 A1 | | 11/2001 | Uribe |
| 2002/0182463 A1 | * | 12/2002 | Jones et al. ............ 429/23 |
| 2003/0022033 A1 | | 1/2003 | Stimming et al. |
| 2003/0138683 A1 | | 7/2003 | Bai |

FOREIGN PATENT DOCUMENTS

| | | |
|---|---|---|
| DE | 197 10 819 C1 | 4/1998 |
| DE | 10134193 | 2/2002 |
| EP | 0701294 | 3/1996 |
| WO | WO 01/01508 A1 | 1/2001 |
| WO | WO 01/99218 A1 | 12/2001 |

OTHER PUBLICATIONS

Journal of Electroanalytical Chemistry, vol.: 461, Issue: 1-2, Jan. 29, 1999, pp. 14-31, " Methanol oxidation and direct methanol fuel cells: a selective review", Wasmus and Küver.

* cited by examiner

*Primary Examiner*—Edward H. Tso
(74) *Attorney, Agent, or Firm*—Dennis R. Haszko; Borden Ladner Gervais LLP

(57) ABSTRACT

Methods and devices for rejuvenating, supplementing, or bypassing an individual fuel cell or a group of fuel cells, in a fuel cell stack, is disclosed. The methods and devices provide for a mechanism for removing catalyst poisons on both the anode portion and the cathode portion of the fuel cell and providing an improvement in the operation of the electrolytes. A controller that controls a variable resistor or a variable power supply in parallel with an individual fuel cell or a group of fuel cells in a stack is utilized. Adjusting the resistive value of the variable resistor, or the voltage level of the variable power supply, directly controls the current in the fuel cell. In accordance with Kirchoff's Current Law, decreasing the fuel cell voltage increases the current through the fuel cell, while the fuel cell stack is operational, and poisons deposited on the anode and cathode electrocatalysts are removed, thereby rejuvenating the fuel cell. Typically, the removal of cell poisons only requires short, periodic pulsing of the fuel cell potential. Methods and devices for determining the limiting processes within a fuel cell thus enabling the optimization of the fuel cell stack performance to diagnose the fuel cell stack are also disclosed.

41 Claims, 18 Drawing Sheets

METHOD AND APPARATUS FOR REJUVENATING FUEL CELLS

CROSS REFERENCE TO RELATED APPLICATIONS

This is a continuation-in-part of application Ser. No. 10/108,491 filed on Mar. 29, 2002 now abandoned and also claims priority to Patent Cooperation Treaty Application Serial No. PCT/CA03/00448 filed on Mar. 28, 2003.

FIELD OF INVENTION

The present invention relates to fuel cells and more particularly, to methods and devices that can manage the operational health of fuel cells singly or in fuel cell stacks.

BACKGROUND TO THE INVENTION

The past few decades has seen an explosion of interest in environmental matters. One consequence of this has been the beginning of a movement away from fossil fuel based energy sources with their attendant effects on pollution. One seemingly viable alternative to such traditional energy sources, especially for automobiles, is the electrochemical fuel cell.

Electrochemical fuel cells convert reactants, namely fuel and oxidant fluid streams, to produce electric power and reaction products. Such cells can operate using various reactants—the fuel stream may be substantially pure hydrogen gas, a gaseous hydrogen-containing reformate stream, a solution of methanol, or any other suitable reactant. The oxidant may be substantially pure oxygen or a dilute stream such as air containing oxygen.

One drawback to current fuel cells is the degradation in a cell's power output over time. Impurities, either from the reactant streams or generated from within the fuel cell as intermediate species during the fuel cell reactions, may be adsorbed or deposited on the surface of the anode and the cathode electrocatalysts. One theory is that these intermediate species block portions of the electrocatalyst and prevents these portions from inducing the desired electrochemical reaction. Such impurities are known as electrocatalyst "poisons" and their effect on electrochemical fuel cells is known as "electrocatalyst poisoning". Such "poisoning" reduces fuel cell performance by reducing the voltage output from the cell for that cell's current density. The deposit of electrocatalyst poisons may be cumulative—over time, even minute concentrations of poisons in a fuel or oxidant stream may result in a degree of electrocatalyst poisoning.

The sources of such poisons, as mentioned above, are legion. Reformate streams derived from hydrocarbons or oxygenated hydrocarbons typically contain a high concentration of hydrogen fuel but also typically contain electrocatalyst poisons such as carbon monoxide. Because of such a presence, the fuel stream may be pretreated prior to its direction to the fuel cell. Pre-treatment methods may employ catalytic or other methods to remove carbon monoxide. Unfortunately, pre-treatment methods cannot efficiently remove all of the carbon monoxide. Even trace amounts such as 10 parts per million (ppm) can eventually result in electrocatalyst poisoning.

Fuel cell components and other fluid streams in the fuel cell may also be a source of impurities. As an example, fuel cell separator plates are commonly made from graphite. Organic impurities in graphite may leech out and poison the electrocatalyst. Other poisons may be generated by the reaction of substances in the reactant streams with the fuel cell component materials. A further possible source of poison is from intermediate products in the oxidation process. For cells that use complex fuels, such as methanol, this is particularly important.

In a similar way, the oxidant stream may also contain or produce impurities that inhibit the electrochemical reaction at the cathode. These impurities may originate within the cathode stream, may be generated in-situ or may originate elsewhere in the fuel cell and be transported to the cathode (e.g. organic impurities from the materials used to construct the fuel cell or unreacted or partially reacted fuel from the fuel stream). When air is used as an oxidant, a wide range of atmospheric impurities that are known to be electrocatalyst poisons, may be present. These may include sulphur containing compounds, nitrogen oxides and so on. Adsorption of impurities or the oxidant with the electrocatalyst can also block the electrocatalyst at the anode. It is known that platinum-containing electrocatalysts can react with oxygen to form hydroxides at high cell potentials that inhibit the fuel cell reaction.

A few methods have been developed which attempt to overcome the electrocatalyst poisoning issue. The anode or cathode may be purged with an inert gas. However, this method involves suspending power generation by the fuel cell. Another approach is that of introducing a "clean" fuel stream containing no carbon monoxide or other poisons to a poisoned fuel cell anode. Where the adsorption is reversible, an equilibrium process results in some rejuvenation of the electrocatalyst. However, such a method is not effective against irreversibly adsorbed poisons. Furthermore, the recovery of the anode electrocatalyst by such an equilibrium process can be very slow, during which time the fuel cell is unable to operate at full capacity.

Yet another approach is to continuously introduce a low concentration of oxygen into the fuel stream upstream of the fuel cell, as disclosed by Gottesfeld in U.S. Pat. No. 4,910,099. Unfortunately, this approach has its own drawbacks, such as parasitic losses from oxygen bleed; undesirable localized exothermic reactions at the anode, and dilution of the fuel stream.

Wilkinson et al in U.S. Pat. No. 6,096,448 discloses periodic fuel starvation of the anode to increase the anode potential. This oxidizes and removes electrocatalyst poisons. Wilkinson describes three methods of accomplishing this fuel starvation: momentary interruption of the fuel supply by closing valves both upstream and downstream of the fuel supply, periodically introducing pulses of fuel free fluid into the fuel supply, and momentarily increasing the electrical load on the cell without increasing the fuel supply.

With each of these methods, the anode potential rises because of fuel depletion at the anode. Unfortunately, none of these methods allow direct control of the anode potential. Furthermore, treatment is applied on a stack basis and hence necessarily causes disruption of stack performance.

The PCT Patent Publication WO 01/01508, by Colbow et al., discloses a method and apparatus for operating an electrochemical fuel cell with periodic reactant starvation. Similar, to the Wilkinson patent, Colbow teaches the oxidant starvation of the cathode portion of the fuel cell while the fuel cell continues to produce power to a particular load.

Both Uribe et al., US Patent Publication US 2001/0044040 A1, and Donohue et al., PCT Patent Application WO 01/99218, have disclosed that a brief, periodic increase the output load to reduce cathode potential below 0.6 V can remove chemisorbed OH at the cathode electrocatalyst surface and increase the output of the fuel cell at high operating voltages. The Patent application of Donahue et al teaches several methods for accomplishing this regeneration at the cathode.

The U.S. Pat. No. 6,339,313, issued to Adams et al., discloses a voltage source coupled across a fuel cell. The current derived from the voltage source increases the anode potential of the fuel cell to remove electrocatalyst poisons. Adams further teaches a controller which is connected to a switch bank. The controller utilizes the switch bank to increase current through at least one fuel cell in a fuel cell stack. The Adams patent discloses that a malfunctioning fuel cell, in the fuel cell stack, may be supplemented or replaced with a voltage source.

Fuel cells have been used as a power source in many applications including in electrical vehicular power plants to replace internal combustion engines and as a residential power source. Proton exchange membrane (PEM) type fuel cells include a "membrane electrode assembly" (MEA) comprising a thin, proton transmissive, non-electrically conductive, solid polymer membrane-electrolyte having the anode on one of its faces and the cathode on the opposite face. The MEA is sandwiched between a pair of electrically conductive elements which (1) serve as current collectors for the anode and cathode, and (2) contain appropriate channels and/or openings therein for distribution of the fuel cell's gaseous reactants over the surfaces of the respective anode and cathode catalysts. A plurality of individual cells are commonly bundled together to form a PEM fuel cell stack. The term fuel cell is typically used to refer to either a single cell or a plurality of cells (stack) depending on the context.

In PEM fuel cells hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and admixed with a proton conductive resin. The catalytic particles are typically costly precious metal particles. These membrane electrode assemblies which comprise the catalyzed electrodes, are relatively expensive to manufacture and require certain controlled conditions in order to prevent damage thereto.

For vehicular and residential applications, it is desirable to use a liquid fuel, preferably a hydrocarbon or alcohol, such as methanol, or gasoline as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished heterogeneously within a chemical fuel processor, known as a reformer, that provides thermal energy throughout a catalyst mass and yields a reformate gas comprising primarily hydrogen and carbon dioxide but which also includes small amounts of carbon monoxide which is a catalyst poison.

For PEM fuel cell systems, the reaction within the fuel cell must be carried out under conditions which preserve the integrity of the cell and its valuable polymeric and precious metal catalyst components. Since the anode, cathode and electrolyte layers of the MEA assembly are each formed of polymers, it is evident that the integrity and/or capabilities of such polymers may be adversely affected if exposed to too high a temperature.

Many factors must be controlled within the stack to obtain optimum performance from a PEM fuel cell system. Control of water balance in the membrane and at the electrode surfaces is critical if good performance is to be obtained. If the membrane dries out, the cell resistance increases resulting in a drop in cell voltage and the production of heat which can lead to a negative hydration spiral resulting in cell failure as a result of membrane perforation. On the other hand, if water is not removed properly from the cathode surface as it is produced, the cell can flood resulting in poor system performance. Likewise, poisons can accumulate at the anode and cathode surface resulting in poor performance. There are thus a variety of factors that can result in a drop of cell voltage for a given current. Methods for the control of fuel cells based on the measurement of the voltage of individual fuel cells or groups of fuel cells, as disclosed by Keskula et al, U.S. Pat. No. 6,406,806, relating to fuel cell voltage monitoring and system control, are ineffective since there are a number of factors that can lead to such a voltage decline.

From the above, there is therefore a need for devices and methods which address the issue of electrocatalyst poisoning while avoiding the problems associated with the restorative efforts described above. The present invention seeks to overcome the aforementioned shortcomings by removing the poisoning from fuel cells through connecting a variable resistive means, also termed a variable load, or voltage source in parallel with the cells in a fuel cell stack. Furthermore, the present invention seeks to provide an improved device and diagnostic method for controlling processes within the fuel cell stack to manage the operation of the fuel cells individually or in groups of fuel cells.

SUMMARY OF THE INVENTION

The present invention provides methods and devices for rejuvenating an individual fuel cell or a group of fuel cells, in a fuel cell stack, while avoiding the problems encountered by the prior art. The methods and devices of the present invention provide for a means for removing catalyst poisons on both the anode portion and the cathode portion of the fuel cell and providing an improvement in the operation of the electrolytes. The invention provides a controller that controls a variable resistive means or a variable power supply in parallel with an individual fuel cell or a group of fuel cells in a stack. Adjusting the resistive value of the variable resistive means, or the voltage level of the variable power supply, directly controls the current in the fuel cell. In accordance with Kirchoff's Current Law, decreasing the fuel cell voltage increases the current through the fuel cell, while the fuel cell stack is operational, and poisons deposited on the anode and cathode electrocatalysts are removed, thereby rejuvenating the fuel cell. While the current is increased through the fuel cell, the fuel cell stack remains operational at a constant current level. Typically, the removal of cell poisons only requires short, periodic pulsing of the fuel cell potential. With a variable power supply, the potential of the fuel cell may be reversed, a condition that has been shown to be effective for the removal of certain catalyst poisons. When a variable resistive means is used, reduction of fuel cell potential is limited to approximately 0 Volts.

The excess current through the fuel cell, over and above the current level of the fuel cell stack, is passed through the variable resistive means, or the variable power supply. Each fuel cell in a stack can be treated sequentially or in parallel, causing a reduction of the effects of electrocatalyst poison on stack performance. If one or more fuel cells in the stack are not performing properly, the rejuvenation of those fuel cells may be prioritized such that each fuel cell is treated one at a time according to their respective priority level. The process of rejuvenation may not only reduce catalyst poisons in the fuel cell, but also may affect electrolyte membrane humidification and cell temperature thereby improving cell performance.

The present invention further provides methods and devices for replacing or supplementing an individual fuel cell or a group of fuel cells, in a fuel cell stack, while avoiding the problems encountered by the prior art. The catalyst poisoning or the dehydration of a particular fuel cell may lead to cell failure. Such cell failure may adversely effect the performance of other adjacent or proximate fuel cells in the stack and thus reduce the overall reliability and life of a fuel cell stack. A malfunctioning fuel cell or group of fuel cells, in the fuel cell stack, may be supplemented or replaced with use of a variable power supply operated by a controller. In contrast with the rejuvenation process and in accordance with Kirchoffs Current Law, increasing the fuel cell voltage above its normal operating voltage decreases the current through the fuel cell, while the fuel cell stack is operational, thereby allowing some or all of the stack current to flow through the variable power supply. An advantage of the use of a variable power supply is that use can be made of the available energy from a weak cell and the cell voltage is maintained. A weak or failed fuel cell or group of fuel cells can also be bypassed, however, by the coupling of a variable resistive means in parallel with the defective fuel cell as directed. In this case, the available energy from the cell is lost.

The present invention provides an improved device and method for diagnosing problems encountered and controlling processes within the fuel cell stack. The methods and devices of the present invention provide for a means for determining the limiting processes within a fuel cell thus enabling the optimization of the fuel cell stack performance. The invention provides a controller that controls a variable resistive means or a variable power supply in parallel with an individual fuel cell or a group of fuel cells in a stack. Adjusting the resistive value of the variable resistive means, or the voltage level of the variable power supply, directly controls the current in the fuel cell. In accordance with Kirchoffs Current Law, decreasing the fuel cell voltage increases the current through the fuel cell, while the fuel cell stack is operational. Observation of the response of the fuel cell provides a method for determining what process is controlling the output from the cell. If the fuel cell is flooded, the cell voltage will decrease following the application of a current pulse. In contrast, when poisons at the anode or cathode are limiting stack performance, the cell voltage will increase following the application of a current pulse.

While the use of a variable power supply advantageously offers improved control of cell potential and supplementation or replacement of a defective fuel cell, the utilization of a variable resistive means provides a means for cell regeneration and replacement and is a relatively inexpensive implementation of the present invention.

High power quality control, especially that of the voltage output from the fuel cell stack, within a specified range, is necessary for the operation of many electronic devices and systems. The present fuel cell management system provides a method of achieving and maintaining power quality on loads powered by the fuel cell stacks. Through use of the controller, the system maintains a predefined power output level from the fuel cell stack, thus maintaining power quality.

In a first aspect, the present invention provides a device for performing an operation on an individual fuel cell while the fuel cell is operational, the device comprising:
  a variable resistive means coupled to the fuel cell; and
  a controller for adjusting the variable resistive means, the controller having measuring means for determining a voltage level and a current level of the fuel cell, the controller adjusting the variable resistive means based on the voltage level and the current level of the fuel cell.

In a second aspect, the present invention provides a device for performing an operation on an individual fuel cell while the fuel cell is operational, the device comprising:
  a variable power supply coupled to the fuel cell; and
  a controller for adjusting the variable power supply applied across the fuel cell, the controller having measuring means for determining a voltage level and a current level of the fuel cell, the controller adjusting the variable power supply based on the voltage level and the current level of the fuel cell.

In a third aspect, the present invention provides a device for performing an operation on an individual fuel cell in a fuel cell stack, the fuel cell stack having a plurality of fuel cells coupled to each other in series, the device comprising:
  a controller having measuring means for determining a voltage level across each fuel cell and a current level across the fuel cell stack;
  a plurality of variable resistive means for providing a variable resistive value, each variable resistive means coupled to one of the plurality of fuel cells, and each variable resistive means connected to the controller; and
  a power supply coupled to the controller;
  wherein the controller adjusts the variable resistive value to change the voltage level across a particular fuel cell.

In a fourth aspect, the present invention provides a device for performing an operation on an individual fuel cell in a fuel cell stack, the fuel cell stack having a plurality of fuel cells coupled to each other in series, the device comprising:
  a controller having measuring means for determining a voltage level across each fuel cell a current level across the fuel cell stack;
  a plurality of variable power supplies for providing a variable voltage source, each variable power supply coupled to one of the plurality of fuel cells, and each variable power supply connected to the controller; and
  a power supply coupled to the controller;
  wherein the controller adjusts the voltage level of the each variable power supply to change the voltage level across a particular fuel cell.

In a fifth aspect, the present invention provides a device for performing an operation on an individual fuel cell in a fuel cell stack, the fuel cell stack having a plurality of fuel cells coupled to each other in series, the device comprising:
  a controller having measuring means for determining a voltage level and a current level across the fuel cell stack;
  a variable resistive means controlled by the controller; and
  a switch means connected across each of the plurality of fuel cells, and connected to both the controller and the variable resistive means;
  wherein the controller adjusts a variable resistive value of the variable resistive means to change the voltage level across a particular fuel cell based on the voltage level and the current level, and wherein the controller enables the switch to increase current through the particular fuel cell.

In a sixth aspect, the present invention provides a device for performing an operation on an individual fuel cell in a fuel cell stack, the fuel cell stack having a plurality of fuel cells coupled to each other in series, the device comprising:
  a controller having measuring means for determining a voltage level and a current level across the fuel cell stack;
  a variable power supply controlled by the controller; and
  a switch means connected across each of the plurality of fuel cells, and connected to both the controller and the variable resistive means;
  wherein the controller adjusts a voltage level of the variable power supply to change the voltage level across a particular fuel cell based on the voltage level and the current level, and
  wherein the controller enables the switch to increase current through the particular fuel cell.

In a seventh aspect, the present invention provides a method of rejuvenating an individual fuel cell, including the steps of:
  a) coupling a variable resistive means across the fuel cell;
  b) providing a voltage source to the variable resistive means;
  c) measuring a voltage level across the fuel cell;
  d) measuring a current level across the fuel cell; and
  d) controlling the variable resistive means based on the voltage level and the current level measured in step c) and d).

In an eighth aspect, the present invention provides a method of bypassing an individual fuel cell in a stack of fuel cells, including the steps of:
  a) coupling a variable resistive means across the fuel cell;
  b) providing a voltage source to the variable resistive means;
  c) measuring a voltage level across the fuel cell; and
  d) controlling the variable resistive means based on the voltage level measured in step c) to bypass current through the variable resistive means.

In a ninth aspect, the present invention provides a method of rejuvenating an individual fuel cell in a fuel cell stack, including the steps of:
  a) coupling a variable power supply across the fuel cell;
  b) providing a voltage level across the fuel cell;
  c) measuring a voltage level across the fuel cell and a current level of the fuel cell stack; and
  d) controlling the voltage level based on the voltage level and the current level measured in step c).

In a tenth aspect, the present invention provides a method of bypassing an individual fuel cell in a fuel cell stack, including the steps of:
  a) coupling a variable power supply across the fuel cell;
  b) providing a voltage level across the fuel cell;
  c) measuring a voltage level across the fuel cell and a current level of the fuel cell stack; and
  d) controlling the voltage level based on the voltage level and the current level measured in step c) to bypass current from the fuel cell.

In an eleventh aspect, the present invention provides a method of supplementing an individual fuel cell in a stack of fuel cells, including the steps of:
  a) coupling a variable power supply across the fuel cell;
  b) providing a voltage level across the fuel cell;
  c) measuring a voltage level across the fuel cell and a current level of the fuel cell stack; and
  d) controlling the voltage level based on the voltage level and the current level measured in step c) to supplement the voltage level across the fuel cell.

In a twelfth aspect, the present invention provides a method of detecting and rejuvenating a weak fuel cell in a stack of fuel cells by a fuel cell management system, including the steps of:
  a) selecting a fuel cell for detection;
  b) measuring a voltage level of the selected fuel cell;
  c) comparing the voltage level with a predefined voltage level threshold;
  d) if the voltage level is less than the predefined voltage level threshold, adjusting a variable resistive value across the fuel cell to increase the current through the fuel cell, and output the voltage level measured in step b) to update the fuel cell management system; and
  e) if the voltage level is at least equal to the predefined voltage level threshold, repeating steps a) through e).

In a thirteenth aspect, the present invention provides a method of detecting catalyst poisons in at least two fuel cells in a fuel cell stack and prioritizing the rejuvenation of at least two fuel cells by a fuel cell management system, including the steps of:
  a) measuring a voltage level across each of the at least two fuel cells;
  b) measuring a voltage level across the fuel cell stack;
  c) detecting a level of catalyst poisons in at least two fuel cells based on the voltage level measured in step a) and the voltage level measured in step b);
  d) prioritizing each of the at least two fuel cells based on the level of catalyst poisons determined in step c);
  e) for a highest priority level, adjusting a variable resistive value across a first fuel cell having the highest priority level, and updating the level of catalyst poisons in the first cell;
  f) if the two fuel cells have been prioritized in step d), adjusting a variable resistive value across a second fuel cell; and
  g) if at least two fuel cells have been prioritized in step d), repeating step c) through g).

In a fourteenth aspect, the present invention provides a method of detecting and rejuvenating a weak fuel cell in a stack of fuel cells by a fuel cell management system, including the steps of:
  a) selecting a fuel cell for detection;
  b) measuring a voltage level of the selected fuel cell;
  c) comparing the voltage level with a predefined voltage level threshold;
  d) if the voltage level is less than the predefined voltage level threshold, applying a voltage level value across the fuel cell to increase the current through the fuel cell, and output the voltage level measured in step b) to update the fuel cell management system; and
  e) if the voltage level is at least equal to the predefined voltage level threshold, repeating steps a) through e).

In a fifteenth aspect, the present invention provides a method of detecting catalyst poisons in at least two fuel cells in a fuel cell stack and prioritizing the rejuvenation of at least two fuel cells by a fuel cell management system, including the steps of:
  a) measuring a voltage level across each of the at least two fuel cells;
  b) measuring a voltage level across the fuel cell stack;
  c) detecting a level of catalyst poisons in at least two fuel cells based on the voltage level measured in step a) and the voltage level measured in step b);

d) prioritizing each of the at least two fuel cells based on the level of catalyst poisons determined in step c);

e) for a highest priority level, applying a voltage level across a first fuel cell having the highest priority level, and updating the level of catalyst poisons in the first cell;

f) if the two fuel cells have been prioritized in step d), applying a voltage level value across a second fuel cell; and g) if at least two fuel cells have been prioritized in step d), repeating step c) through g).

In a sixteenth aspect, the present invention provides a method of detecting catalyst poisons and rejuvenating a weak fuel cell in a stack of fuel cells by a fuel cell management system, including the steps of:

a) measuring a stack voltage level;

b) comparing the stack voltage level with a predefined stack voltage level;

c) if the stack voltage level is less than the predefined stack voltage level, executing the steps of:

c1) selecting a fuel cell for detection;

c2) measuring a cell voltage level of the fuel cell;

c3) comparing the cell voltage level with a predefined cell voltage level threshold;

c4) if the voltage level is less than the predefined cell voltage level threshold, adjusting a variable resistive value across the fuel cell, and outputting cell voltage level measured in step to update the fuel cell management system;

c5) if the voltage level is at least equal to the predefined voltage level threshold, repeating steps a) through c); and d) if the stack voltage level is at least equal to the predefined voltage, repeating steps a) through d).

In a seventeenth aspect, the present invention provides a method of detecting catalyst poisons and rejuvenating a weak fuel cell in a stack of fuel cells by a fuel cell management system, including the steps of:

a) measuring a stack voltage level;

b) comparing the stack voltage level with a predefined stack voltage level;

c) if the stack voltage level is less than the predefined stack voltage level, executing the steps of:

c1) selecting a fuel cell for detection;

c2) measuring a cell voltage level of the fuel cell;

c3) comparing the cell voltage level with a predefined cell voltage level threshold;

c4) if the voltage level is less than the predefined cell voltage level threshold, applying a voltage level across the fuel cell, and outputting cell voltage level measured in step to update the fuel cell management system;

c5) if the voltage level is at least equal to the predefined voltage level threshold, repeating steps a) through c); and d) if the stack voltage level is at least equal to the predefined voltage, repeating steps a) through d).

In an eighteenth aspect, the present invention provides a method of bypassing a weak fuel cell in a stack of fuel cells detected by a fuel cell management system, including the steps of:

a) selecting a fuel cell for detection, b) measuring a voltage level of the selected fuel cell and a current level of the stack of fuel cells;

c) comparing the voltage level with a predefined voltage level threshold; and d) if the voltage level is less than the predefined voltage level threshold, applying a variable power supply for increasing the voltage level across the selected fuel cell to bypass current flowing through the fuel cell to the power supply and output the voltage level measured in step (b) to update the fuel cell management system.

In a nineteenth aspect, the present invention provides a method of bypassing a weak fuel cell in a stack of fuel cells detected by a fuel cell management system, including the steps of:

a) selecting a fuel cell for detection, b) measuring a voltage level of the selected fuel cell and a current level of the stack of fuel cells;

c) comparing the voltage level with a predefined voltage level threshold; and d) if the voltage level is less than the predefined voltage level threshold, applying a variable power supply for increasing the voltage level across the selected fuel cell to bypass current flowing through the fuel cell to the power supply.

In a twentieth aspect, the present invention provides a method of supplementing a weak fuel cell in a stack of fuel cells detected by a fuel cell management system, including the steps of:

a) selecting a fuel cell for detection, b) measuring a voltage level of the selected fuel cell and a current level of the stack of fuel cells;

c) comparing the voltage level with a predefined voltage level threshold;

d) if the voltage level is less than the predefined voltage level threshold, applying a variable power supply for increasing the voltage level across the selected fuel cell to increase the voltage level across the selected fuel cell to at least a voltage level equal to the predefined voltage level threshold.

In a twenty-first aspect, the present invention provides a method of supplementing a weak fuel cell in a stack of fuel cells detected by a fuel cell management system, including the steps of:

a) selecting a fuel cell for detection, b) measuring a voltage level of the selected fuel cell and a current level of the stack of fuel cells;

c) comparing the voltage level with a predefined voltage level threshold;

d) if the voltage level is less than the predefined voltage level threshold, applying a variable power supply for increasing the voltage level across the selected fuel cell to increase the voltage level across the selected fuel cell to at least a voltage level equal to the predefined voltage level threshold and output the voltage level measured in step (b) to update the fuel cell management system, and e) if the voltage is at least equal to the predefined voltage level threshold, repeating steps (a) through (c).

In a twenty-second aspect, the present invention provides a method of replacing a weak fuel cell in a stack of fuel cells detected by a fuel cell management system, including the steps of:

a) selecting a fuel cell for detection, b) measuring a voltage level of the selected fuel cell and a current level of the stack of fuel cells;

c) comparing the voltage level with a predefined voltage level threshold; and d) if the voltage level is less than the predefined voltage level threshold, adjusting a variable resistive value across the fuel cell to bypass current around the fuel cell.

In a twenty-third aspect, the present invention provides a method of replacing a weak fuel cell in a stack of fuel cells detected by a fuel cell management system, including the steps of:
  a) selecting a fuel cell for detection,
  b) measuring a voltage level of the selected fuel cell;
  c) comparing the voltage level with a predefined voltage level threshold;
  d) if the voltage level is less than the predefined voltage level threshold, adjusting a variable resistive value across the fuel cell to bypass current around the fuel cell, and output the voltage level measured in step (b) to update the fuel cell management system, and
  e) if the voltage is at least equal to the predefined voltage level threshold, repeating steps (a) through (c).

In a twenty-fourth aspect, the present invention provides a device for performing an operation on an individual fuel cell in a fuel cell stack, the fuel cell stack having a plurality of fuel cells coupled to each other in series, the plurality of fuel cells including a subset of at least one fuel cell within the plurality of fuel cells, the device comprising:
  a controller having measuring means for determining a voltage level and a current level across the subset of at least one fuel cell;
  a variable resistive means controlled by the controller; and
  a switch means connected across the subset of at least one fuel cell, and connected to both the controller and the variable resistive means;
  whereby the controller adjusts the variable resistive value to change the voltage level across the subset of at least one fuel cell based on the voltage level and the current level, and the controller enables the switch to increase current through a particular fuel cell of the subset of at least one fuel cell.

In a twenty-fifth aspect, the present invention provides a device for performing an operation on at least one individual fuel cell in a fuel cell stack, the fuel cell stack having a plurality of fuel cells coupled to each other in series, the plurality of fuel cells including a subset of at least one fuel cell within the plurality of fuel cells, the device comprising:
  a controller having measuring means for determining a voltage level and a current level across the subset of at least one fuel cell;
  a variable resistive means controlled by the controller; and
  a switch means connected across the subset of at least one fuel cell, and connected to both the controller and the variable resistive means;
  whereby the controller adjusts the variable resistive value to adjust the voltage level across the subset of at least one fuel cell based on the voltage level and the current level, and the controller enables the switch to increase current through at least two fuel cells of the subset of at least one fuel cell.

In a twenty-sixth aspect, the present invention provides a device for performing an operation on at least two fuel cells in a fuel cell stack, the fuel cell stack having a plurality of fuel cells coupled to each other in series, the device comprising:
  a controller having measuring means for determining a voltage level and a current level across the fuel cell stack;
  a variable resistive means controlled by the controller; and
  a switch means connected across each of the plurality of fuel cells, and connected to both the controller and the variable resistive means;
  whereby the controller adjusts a variable resistive value of the variable resistive means to change a fuel cell voltage level across each of the at least two fuel cells based on the voltage level and the current level, and the controller simultaneously enables the switch increase current through each of the at least two fuel cells.

In a twenty-seventh aspect, the present invention provides a device for performing an operation on at least two fuel cells in a fuel cell stack, the fuel cell stack having a plurality of fuel cells coupled to each other in series, the device comprising:
  a controller having measuring means for determining a voltage level and a current level across the fuel cell stack;
  a plurality of variable resistive means controlled by the controller; and
  a switch means connected across each of the plurality of fuel cells, and connected to both the controller and the plurality of variable resistive means;
  whereby the controller adjusts at least two variable resistive values corresponding to at least two variable resistive means, of the plurality of variable resistive means, to change the voltage level across at least two fuel cells respectively, based on the voltage level and the current level, and the controller simultaneously enables the switch to increase current through each of the at least two fuel cells.

In a twenty-eighth aspect, the present invention provides a device for performing an operation on an individual fuel cell in a fuel cell stack, the fuel cell stack having a plurality of fuel cells coupled to each other in series, the plurality of fuel cells including a subset of at least one fuel cell within the plurality of fuel cells, the device comprising:
  a controller having measuring means for determining a fuel cell voltage level and a current level across the subset of at least one fuel cell;
  a variable power supply controlled by the controller; and
  a switch means connected across the subset of at least one fuel cell, and connected to both the controller and the variable power supply;
  whereby the controller adjusts a power supply voltage level of the variable power supply to change the voltage level across the subset of at least one fuel cell based on the fuel cell voltage level and the current level, and the controller enables the switch to increase current through a particular fuel cell of the subset of at least one fuel cell.

In a twenty-ninth aspect, the present invention provides a device for performing an operation on at least one individual fuel cell in a fuel cell stack, the fuel cell stack having a plurality of fuel cells coupled to each other in series, the plurality of fuel cells including a subset of at least one fuel cell within the plurality of fuel cells, the device comprising:
  a controller having measuring means for determining a fuel cell voltage level and a current level across the subset of at least one fuel cell;
  a variable power supply controlled by the controller; and
  a switch means connected across the subset of at least one fuel cell, and connected to both the controller and the variable power supply;
  whereby the controller adjusts a power supply voltage level of the variable power supply to change the voltage level across the subset of at least one fuel cell based on the voltage level and the current level, and the controller enables the switch to increase current through at least two fuel cells of the subset of at least one fuel cell.

In a thirtieth aspect, the present invention provides a device for performing an operation on at least two fuel cells in a fuel cell stack, the fuel cell stack having a plurality of fuel cells coupled to each other in series, the device comprising:
- a controller having measuring means for determining a fuel cell voltage level and a current level across the fuel cell stack;
- a variable power supply controlled by the controller; and
- a switch means connected across each of the plurality of fuel cells, and connected to both the controller and the variable resistive means;
- whereby the controller adjusts a power supply voltage level of the variable power supply to change a fuel cell voltage level across each of the at least two fuel cells based on the voltage level and the current level, and the controller simultaneously enables the switch increase current through each of the at least two fuel cells.

In a thirty-first aspect, the present invention provides a device for performing an operation on at least two fuel cells in a fuel cell stack, the fuel cell stack having a plurality of fuel cells coupled to each other in series, the device comprising:
- a controller having measuring means for determining a fuel voltage level of the at least two fuel cells and a current level across the fuel cell stack;
- a plurality of variable power supplies controlled by the controller; and
- a switch means connected across each of the plurality of fuel cells, and connected to both the controller and the plurality of variable power supplies;
- whereby the controller adjusts at least two variable power supply voltage levels corresponding to at least two variable power supplies, of the plurality of variable power supplies, to change the voltage level across the at least two fuel cells respectively, based on the fuel cell voltage level and the current level, and the controller simultaneously enables the switch to increase current through each of the at least two fuel cells.

In a thirty-second aspect, the present invention provides a method of detecting catalyst poisons in at least two fuel cells in a fuel cell stack and prioritizing the rejuvenation of at least two fuel cells by a fuel cell management system, including the steps of:
a) measuring a fuel cell voltage level across each of the at least two fuel cells;
b) measuring a stack voltage level and a current level across the fuel cell stack;
c) detecting a level of catalyst poisons in at least two fuel cells based on the fuel cell voltage level measured in step a) and the stack voltage level measured in step b);
d) prioritizing each of the at least two fuel cells based on the level of catalyst poisons determined in step c); and
e) for a given priority level, adjusting the fuel cell voltage level across at least one fuel cell of the at least two fuel cells, by applying a pulse across the at least one fuel cell, the pulse being defined by at least one parameter, the at least one parameter being determined based on the level of catalyst poisons.

In a thirty-third aspect, the present invention provides a method of detecting catalyst poisons in a group of at least two fuel cells in a fuel cell stack and prioritizing the rejuvenation of the group of at least two fuel cells by a fuel cell management system, including the steps of:
a) measuring a fuel cell voltage level across the group of at least two fuel cells;
b) measuring a stack voltage level and a current level across the fuel cell stack;
c) detecting a level of catalyst poisons in the group of at least two fuel cells based on the fuel cell voltage level and the current level measured in step a) and the stack voltage level and the current level measured in step b); and
d) adjusting a variable resistive value of the resistive means connected across the group of at least two fuel cells.

In a thirty-fourth aspect, the present invention provides a method of detecting catalyst poisons in a group of at least two fuel cells in a fuel cell stack and prioritizing the rejuvenation of the group of at least two fuel cells by a fuel cell management system, including the steps of:
a) measuring a fuel cell voltage level across the group of at least two fuel cells;
b) measuring a stack voltage level and a current level across the fuel cell stack;
c) detecting a level of catalyst poisons in the group of at least two fuel cells based on the fuel cell voltage level measured in step a) and the stack voltage level and the current level measured in step b); and
d) adjusting a variable resistive value of the resistive means connected across the group of at least two fuel cells to bypass current through the resistive means.

In a thirty-fifth aspect, the present invention provides a method of detecting catalyst poisons in a group of at least two fuel cells in a fuel cell stack and prioritizing the rejuvenation of the group of at least two fuel cells by a fuel cell management system, including the steps of:
a) measuring a fuel cell voltage level across the group of at least two fuel cells;
b) measuring a stack voltage level and a current level across the fuel cell stack;
c) detecting a level of catalyst poisons in the group of at least two fuel cells based on the fuel cell voltage level measured in step a) and the stack voltage level and current level measured in step b); and
d) adjusting a voltage level applied across the group of at least two fuel cells by applying a pulse across the group at least two fuel cells, the pulse being defined by at least one parameter, the at least one parameter being determined based on the level of catalyst poisons.

In a thirty-sixth aspect, the present invention provides a device for rejuvenating at least two fuel cells while the fuel cell is operational, the device comprising:
a variable resistive means coupled to the at least two fuel cells; and a controller for adjusting the variable resistive means, the controller having measuring means for determining a voltage level and a current level of the at least two fuel cells, the controller adjusting the variable resistive means based on the voltage level and the current level of the at least two fuel cells, and the controller deriving power from a power supply.

In a thirty-seventh aspect, the present invention provides a device for rejuvenating an individual fuel cell while the fuel cell is operational, the device comprising:
a variable power supply coupled to at least two fuel cells; and a controller for adjusting the variable power supply applied across the at least two fuel cells, the controller having measuring means for determining a voltage level and a current level of the fuel cell, the controller adjusting the variable power supply based on the voltage level and the current level of the at least two fuel cells, and the controller deriving power from the variable power supply.

In a thirty-eighth aspect, the present invention provides a device for performing an operation on an individual fuel cell while the fuel cell is operational in a fuel cell stack, the device comprising:

a variable resistive means coupled to the fuel cell; and a controller for adjusting the variable resistive means, the controller having measuring means for determining a fuel cell voltage level and a current level of the fuel cell stack, the controller adjusting the variable resistive means based on the voltage level and the current level of the fuel cell; and means for determining a limiting process within a fuel cell thus enabling an optimization of a performance level of the fuel cell stack.

In a thirty-ninth aspect, the present invention provides a device for performing an operation on an individual fuel cell while the fuel cell is operational in a fuel cell stack, the device comprising:

a variable power supply coupled across the fuel cell; and a controller for adjusting the variable resistive means, the controller having measuring means for determining a fuel cell voltage level and a current level of the fuel cell stack, the controller adjusting a power supply voltage level of the variable power supply to change the voltage level based on the fuel cell voltage level and the current level of the fuel cell; and means for determining a limiting process within a fuel cell thus enabling an optimization of a performance level of the fuel cell stack.

BRIEF DESCRIPTION OF THE DRAWINGS

The present invention will now be described with reference to the drawings, in which.

DETAILED DESCRIPTION

The invention will be described for the purposes of illustration only in connection with certain embodiments. However, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

The present invention will be described with reference mainly to rejuvenation of individual fuel cells in a fuel cell stack. However, the present invention is not limited to the rejuvenation of individual fuel cells as the methods and devices of the present invention may be readily applied to groups of fuel cells in a fuel cell stack. Due to economic factors related to cost, rejuvenation of groups of fuel cells in a fuel cell stack may be required, i.e. the reduction in the number of components required to reduce the cost of implementing the fuel cell health management system.

Figure 1:
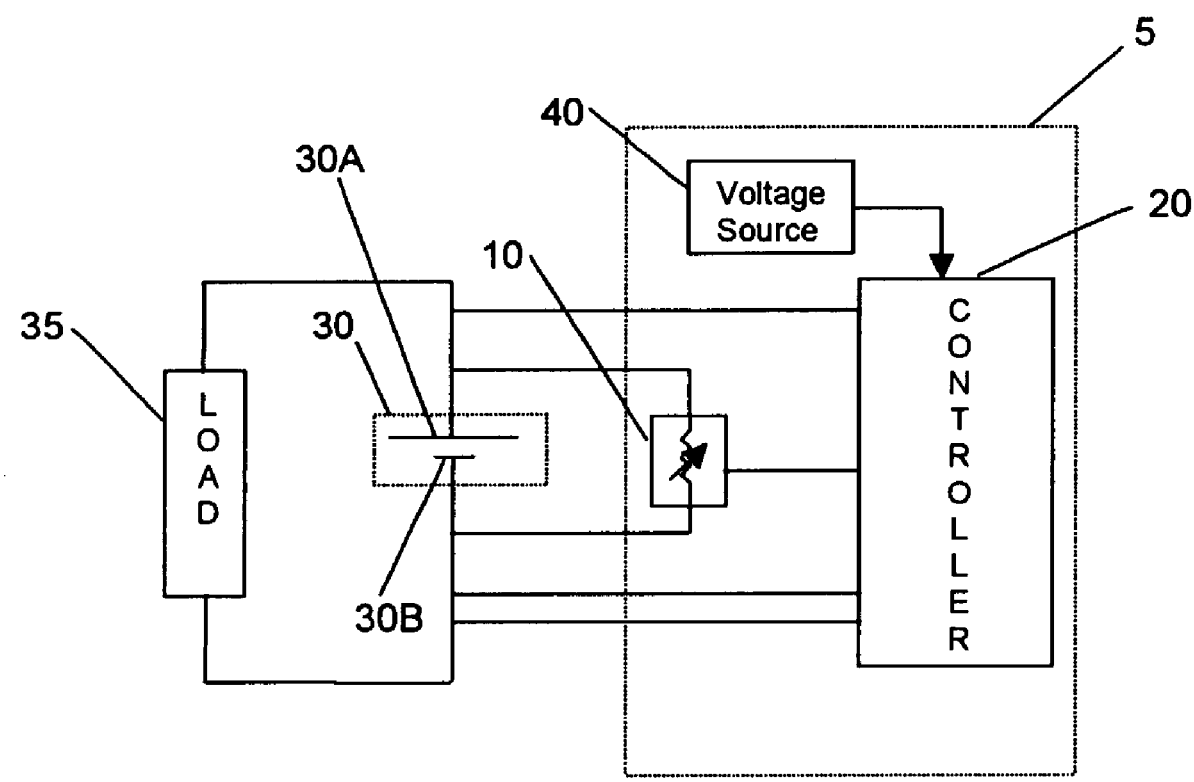
FIG. 1 is a block diagram of the variable resistive means and the controller connected across a single fuel cell.

FIG. 1 is a block diagram of a fuel cell management system 5 according to the present invention. In this first embodiment, the management system 5 consists of a variable resistive means 10 and a controller 20 coupled to a single fuel cell 30. The fuel cell 30 may be connected to a load 35 to provide power to that load 35. The controller 20 is also connected to the variable resistive means 10 in order to control its resistive value. A power supply 40 is connected to the controller 20. The power supply 40 may be derived from any type of power supply, including direct current (DC) and alternating current supplies, or the fuel cell independently.

According to the present invention, the variable resistive means 10 is utilized to reduce the fuel cell voltage to a predefined threshold level for a finite period of time. The controller 20 measures a voltage level across the fuel cell 30. If this measurement is below the predefined threshold level, then cell poisoning is deemed to have occurred and rejuvenation of the fuel cell is commenced. The controller 20 adjusts the value of the variable resistive means 10 in order to decrease the voltage level across the fuel cell 30 for a finite period of time. By adjusting the value of the variable resistive means 10, the current flows through the variable resistive means 10 and, the current flow across the fuel cell 30 is increased. The increase in current level results in a decrease in the voltage level across the fuel cell 30. This decrease in the voltage level causes the removal/oxidization of the poison(s) from the fuel cell 30. The decreased voltage level is maintained across the fuel cell 10 for a predefined period as required by the controller.

The rejuvenation process entails the removal of catalyst poisons located in the fuel cell, and may also affect membrane humidification and cell temperature thereby improving the performance of the fuel cell 30. If the rejuvenation process has been successful, the fuel cell will return to an operating voltage level well above the predefined threshold. Once the fuel cell 30 has been rejuvenated, the fuel cell may provide the required power level to the load 35.

Although the rejuvenation process may be performed in one cycle—a single adjustment of the variable resistive means 30 over a finite period of time—the process may be performed in a plurality of additional cycles. To determine the number of cycles required, the controller 20, after a first cycle, will measure the voltage level across the fuel cell 30. If the voltage level is below the predefined threshold, the controller 20 will adjust the variable resistive means 10 as required, in one or more cycles. Each additional cycle may require an adjustment of the period of time in which the current is increased through the variable resistive means 10. The period is determined by the level of fuel cell rejuvenation of achieved in the previous cycle.

Figure 2A:
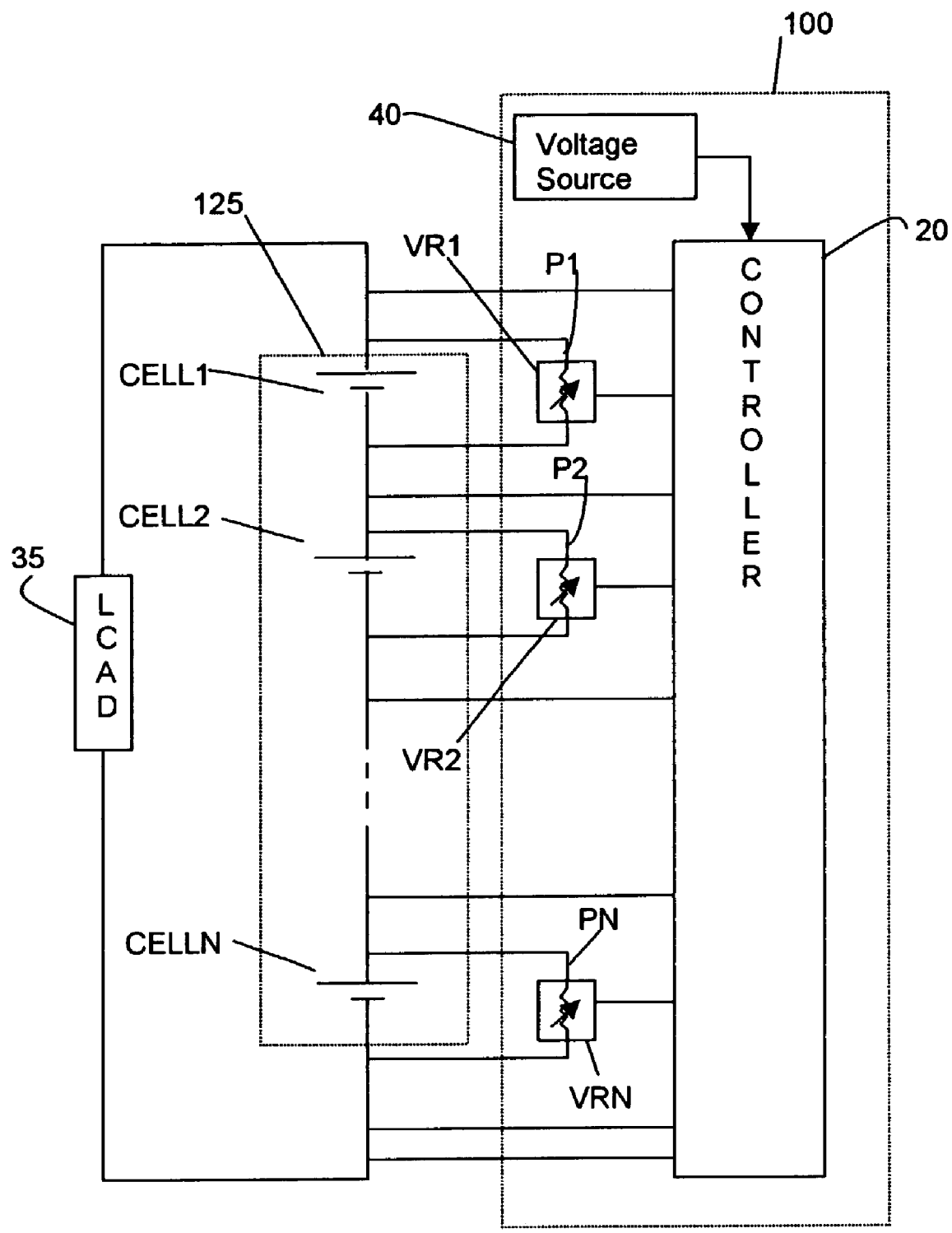
FIG. 2a is a block diagram of a plurality of resistive means and a controller connected to a plurality of fuel cells in a fuel cell stack.

Referring now to FIG. 2*a*, a block diagram of a fuel cell management system 100 for a fuel cell stack 125 is illustrated. The fuel cell management system 100 consists of a controller 20 and a plurality of variable resistive means, VR1, VR2, . . . ,VRN connected to each fuel cell CELL1, CELL2, . . . , CELLN in the fuel cell stack 125. The variable resistive means VR1, VR2, . . . ,VRN, are coupled individually to the fuel cells, CELL1, CELL2, . . . , CELLN. In turn, the controller 20 is connected to each resistive means, VR1, VR2, . . . ,VRN. The controller 20 controls the variable resistive value of each of the variable resistive means VR1, VR2, . . . ,VRN. The controller 20 is further connected to the fuel cells CELL1, CELL2, . . . , CELLN. The connection between the controller 20 and the fuel cells CELL1, CELL2, . . . , CELLN enables the controller to measure the voltage level across each of the fuel cells CELL1, CELL2, . . . , CELLN and the fuel cell stack 125 respectively. The fuel cell stack 125 may be connected to a load 35 in order to provide power to the load 35. An independent power supply 40 feeds the controller 20. Alternatively, the power supply 40 may derive power from the fuel cell stack 125 to power the controller 20.

According to the present invention, the individual variable resistive means VR1, VR2, . . . , VRN are utilized to increase the current of the individual fuel cells CELL1, CELL2, . . . , CELLN to a predefined threshold level for a finite period of time. The controller 20 measures the voltage level and the current level of the fuel cell stack 125. In addition to the stack measurement, the controller 20 measures the voltage level of each of the individual fuel cells CELL1, CELL2, . . . , CELLN in the stack 125. The controller 20 utilizes the measured voltage levels of each of the fuel cells in CELL1, CELL2, . . . , CELLN in order to determine which cells in the stack have been poisoned. The controller 20 then prioritizes the order in which the fuel cells CELL1, CELL2, . . . , CELLN are rejuvenated based on the voltage levels measured or any other predefined prioritization criteria. The controller 20 selects the fuel cell with the highest priority level and adjusts the resistance of the corresponding variable resistive means. The adjustment decreases the voltage level across the corresponding fuel cell. The resultant decrease of the voltage level of the fuel cell causes the removal/oxidization of the poison(s) from the poisoned fuel cell. The controller then proceeds to "rejuvenate" the next fuel cell, having the highest priority level, using the same rejuvenation process described above until the entire fuel cell stack has been rejuvenated. As each fuel cell is rejuvenated, the controller updates on a continuous basis the status of the priority levels so that the priorities may be reordered.

In the event that one or more of the fuel cells in the fuel cell stack cannot be rejuvenated, the controller can minimize the variable resistive means to bypass the current around the weak or failed cell thereby avoiding failure of the entire fuel cell stack and improving the reliability of the fuel cell system.

There are several criteria for determining the priority level associated with each poisoned fuel cell or groups of fuel cells. Accordingly, after measuring the voltage level, a first criterion may be based on the voltage/current levels of both the individual fuel cells and the fuel cell stack measured by the controller. As the fuel cell becomes increasingly poisoned, the fuel cell voltage decreases, and consequently the stack voltage. In this case, the priority level associated with each cell or group of cells may be based solely on the decreases in voltage levels. An optimal time, and period of rejuvenation, may be determined in conjunction with assignment of a fuel cell priority to the poisoned fuel cell.

Other criteria may include the use of sensor devices to determine the gas purity level of the fuel and oxidant in the fuel cell. Such gas sensor devices would be coupled to each fuel cell to determine, on a continual or an intermittent basis, the type of impure gases poisoning the fuel cell. Based on the type of gases detected by the sensor devices, the controller would determine the voltage and length of the pulse required for rejuvenating the poisoned cells. A further criterion may be the amount of energy produced by the fuel cell stack in a given period of time. The rejuvenation process would begin when the stack produced an amount of energy that met a predetermined threshold. By the same token, energy produced by one or a group of fuel cells may also be measured to ascertain whether the rejuvenation process is necessary for one or more fuel cells. Subsequently, the priority levels are determined based on the energy produced by the fuel cells measured in the stack.

Figure 2B:
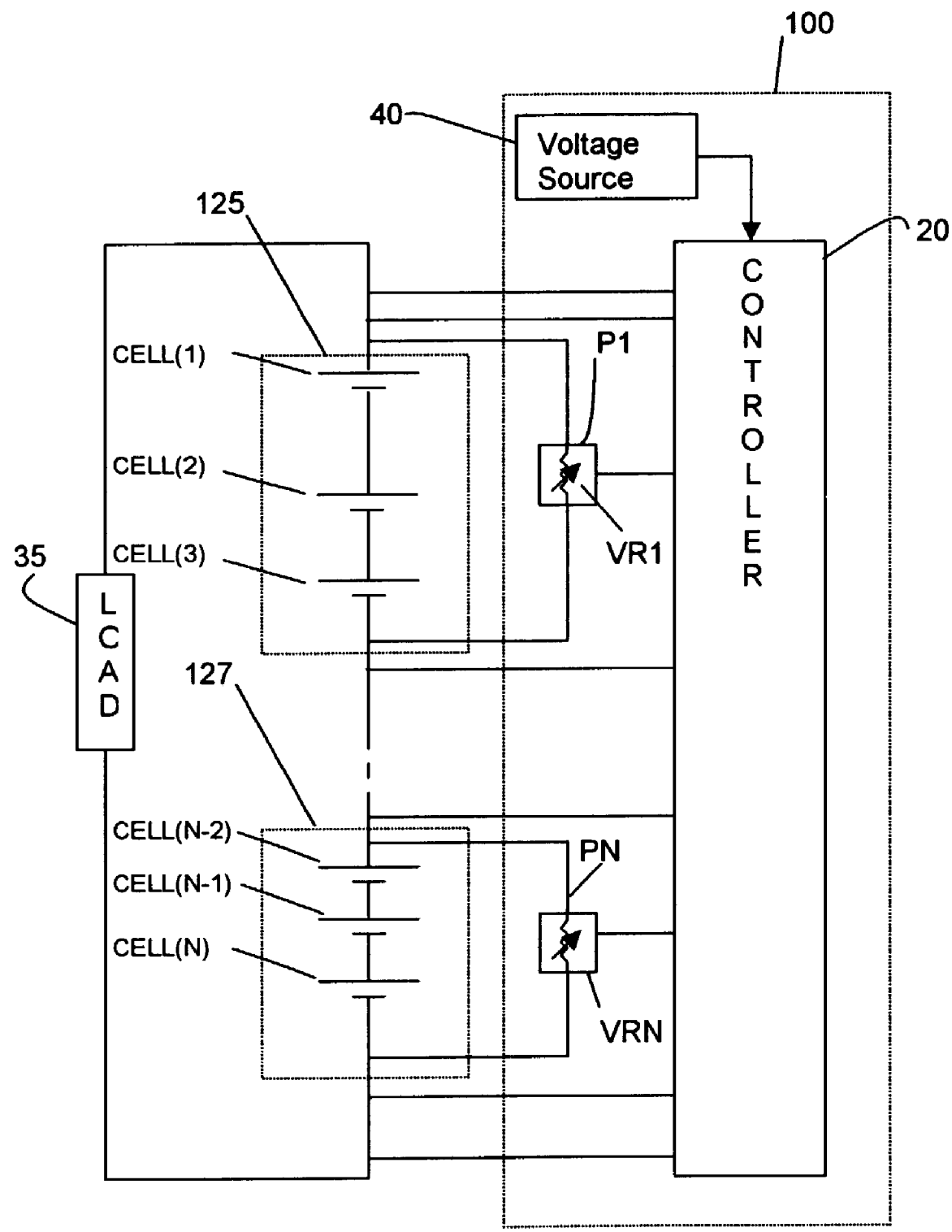
FIG. 2b is a block diagram of a plurality of resistive means and a controller connected to a plurality of fuel cells in a fuel cell stack, as in FIG. 2a, in which each resistive means is coupled across a group of fuel cells in the fuel cell stack.

FIG. 2*b* is a block diagram of a plurality of resistive means and a controller connected to a plurality of fuel cells in a fuel cell stack. FIG. 2*b* differs from FIG. 2*a* in that the variable resistive means is coupled across a group of fuel cells. According to an alternative, the fuel cell management system 100 consists of a plurality of variable resistive means, VR1, VR2, . . . ,VRN and a controller 20 connected to groups of two or more adjacent fuel cells, GROUP1, GROUP2, . . . , GROUP N in the fuel cell stack 125. The variable resistive means VR1, VR2, . . . ,VRN, are coupled individually to the groups of fuel cells, GROUP1, GROUP2, . . . , GROUP N. In turn, the controller 20 is connected to each resistive means, VR1, VR2, . . . ,VRN. The controller 20 controls the variable resistive value of each of the variable resistive means VR1, VR2, . . . ,VRN. The controller 20 is further connected to the groups of fuel cells GROUP1, GROUP2, . . . , GROUP N. The connection between the controller 20 and the groups of fuel cells GROUP1, GROUP2, . . . , GROUP N enables the controller to measure the voltage level across each of the groups of fuel cells GROUP1, GROUP2, . . . , GROUP N and the fuel cell stack 125 respectively. The fuel cell stack 125 may be connected to a load 35 in order to provide power to the load 35. An independent power supply 40 feeds the controller 20. Alternatively, the power supply 40 may derive power from the fuel cell stack 125 to power the controller 20. With respect to the criteria for determining the priority level associated with each poisoned fuel cell, the same criteria would apply for groups of fuel cells.

Figure 3:
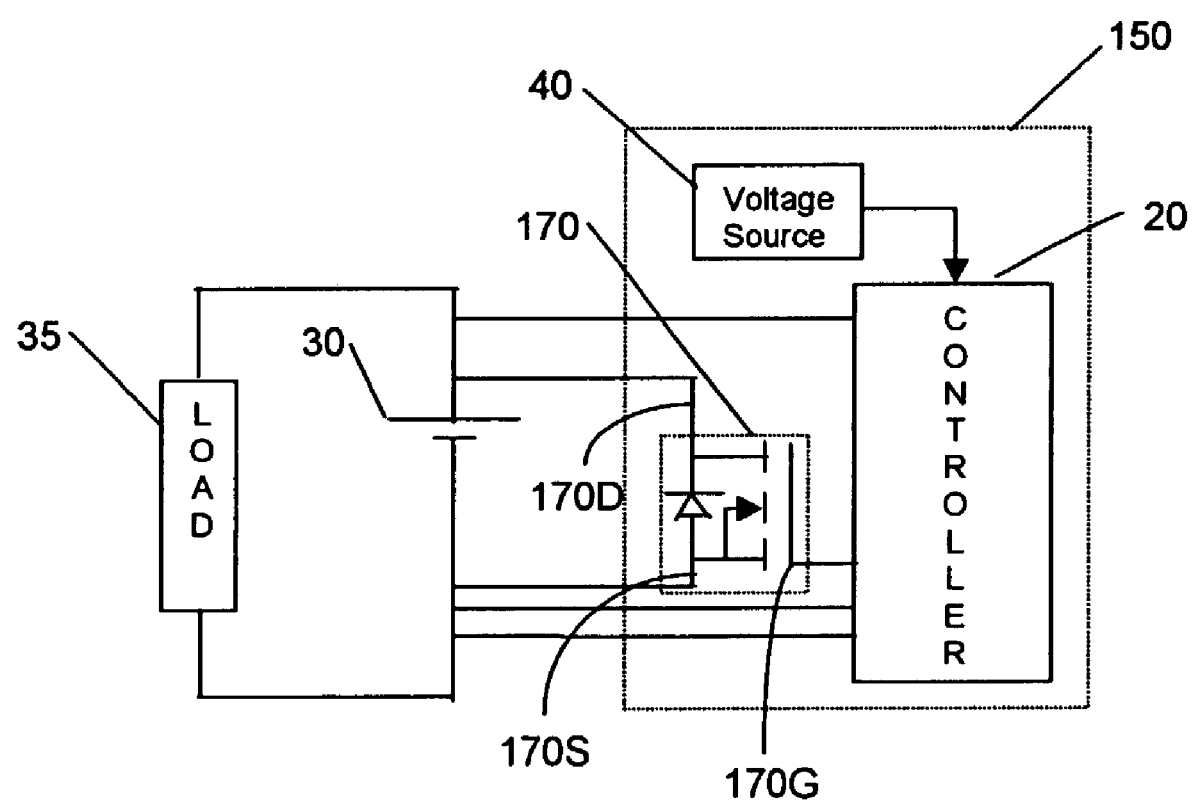
FIG. 3 is a block diagram of a MOSFET utilized as variable resistive means as in FIG. 1.

FIG. 3 illustrates a block diagram of a third embodiment of the fuel cell management system 150. In this embodiment, the fuel cell management system 150 utilizes a Metal-Oxide Semiconductor Field-Effect Transistor (MOSFET) 170, as a resistive means, and a controller 20, each of which are coupled to a single fuel cell 30. Both the drain 170D and the source 170S are coupled across the fuel cell 30. The controller 20 is connected to the gate 170G of the MOSFET 170 to control the variable resistive means of the MOSFET 170. The controller 20 derives power from a power supply 40.

As previously stated, reducing the voltage level across the fuel cell to a predefined threshold level for a finite period rejuvenates a fuel cell. In this embodiment, a MOSFET 170 is utilized to reduce the voltage across the fuel cell 30. The controller 20 measures a voltage level across the fuel cell 30 and determines if this measurement is below a predefined threshold level. If the voltage measured across the fuel cell is determined to be below the predefined threshold level, then cell poisoning has occurred, and rejuvenation of the fuel cell 30 is required. As stated earlier, poisoning may occur on either the anode portion or the cathode portion of the fuel cell 30. Through use of a MOSFET, as a variable resistive means, the controller 20 may remove detected poisons from the fuel cell 30. In the case of poisoning on the anode portion, the controller 20 proceeds to reduce the voltage across the anode portion of the fuel cell 30 in order to remove the poisons that have accumulated. The controller 20 reduces the resistive value of the MOSFET 170 by adjusting its gate-source voltage. This enables the MOSFET 170 to behave as a variable resistive element with a voltage drop that controls the voltage across the fuel cell 30. The controller 20 adjusts the gate-source voltage of the MOSFET 20 to in turn adjust the drain-source voltage until the drain-source voltage level is equal to the voltage level of the fuel cell 30. The adjustments are performed until the voltage across the fuel cell 30 reaches a level where it causes the removal/oxidization of the poison in the fuel cell 30. If the rejuvenation process has been successful, the fuel cell provides an operating voltage level well above the predefined threshold. The controller 20 adjusts the gate-source voltage of the MOSFET 170 until the resistive means of the MOSFET 170 has minimal effect on the operational fuel cell. The rejuvenation process enables the fuel cell to provide full power to the load 35.

Figure 4A:
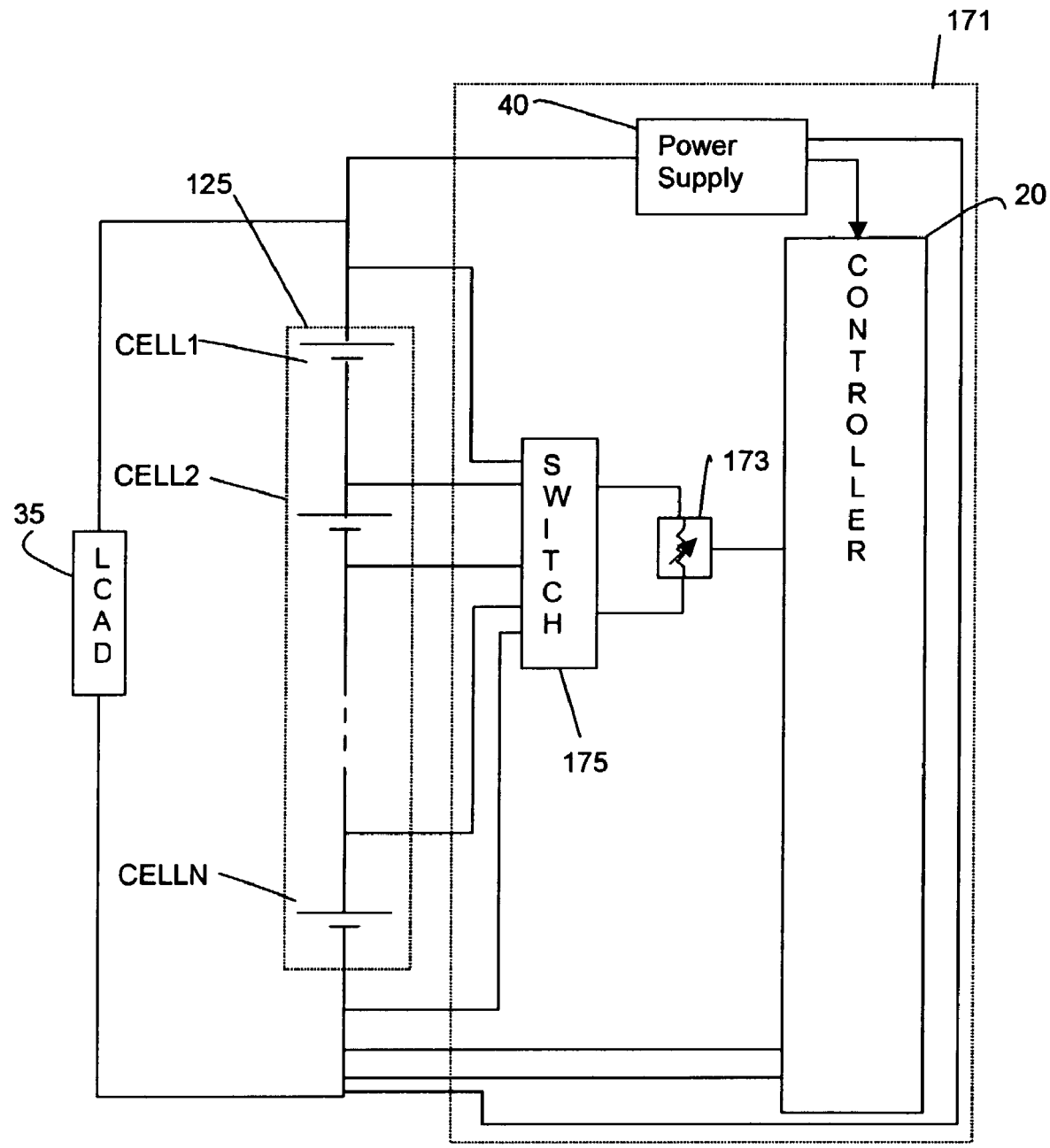
FIG. 4a is a block diagram of a switch means connected to a single variable resistive means and a controller for rejuvenating at least one fuel cell in a fuel cell stack.

FIG. 4a is a block diagram of a fuel cell management system 171 according to an alternative embodiment of the present invention. The fuel cell management system 171 consists of a controller 20, a power supply 40, a variable resistive means 173, and a switch means 175. The fuel cell management system of FIG. 4 utilizes a switch means 175 to reduce the number of variable resistive means required in FIG. 2, across each of the fuel cells in the fuel cell stack 125. The switch means 175 is connected across each of the individual fuel cells CELL1, CELL2, . . . , CELLN in the fuel cell stack 125. The controller 20 adjusts the value of the variable resistive means 173. The controller 20, which is connected across each of the individual fuel cells CELL1, CELL2, . . . , CELLN and the fuel cell stack 125, controls the switch means 175. Based on the voltage level and the current level measured, across the individual fuel cells CELL1, CELL2, . . . , CELLN and the fuel cell stack 125, the controller 20 switches in the variable resistive means 173. The switching means 173 enables the controller 20 to increase current through the variable resistive means 173. The controller 20 derives power from the power supply 40. The power supply may alternatively derive from the fuel cell stack 125 as required. In the event that one or more of the fuel cells in the fuel cell stack 125 cannot be rejuvenated, the controller 20 can connect the variable resistive means 173 to the defective cell and minimize the variable resistive means 173 to bypass the current around the weak or failed cell thereby avoiding failure of the entire fuel cell stack 125 and improving the reliability of the fuel cell system 171. In an alternative embodiment, regeneration could be applied to groups of at least two adjacent fuel cells as described earlier.

Figure 4B:
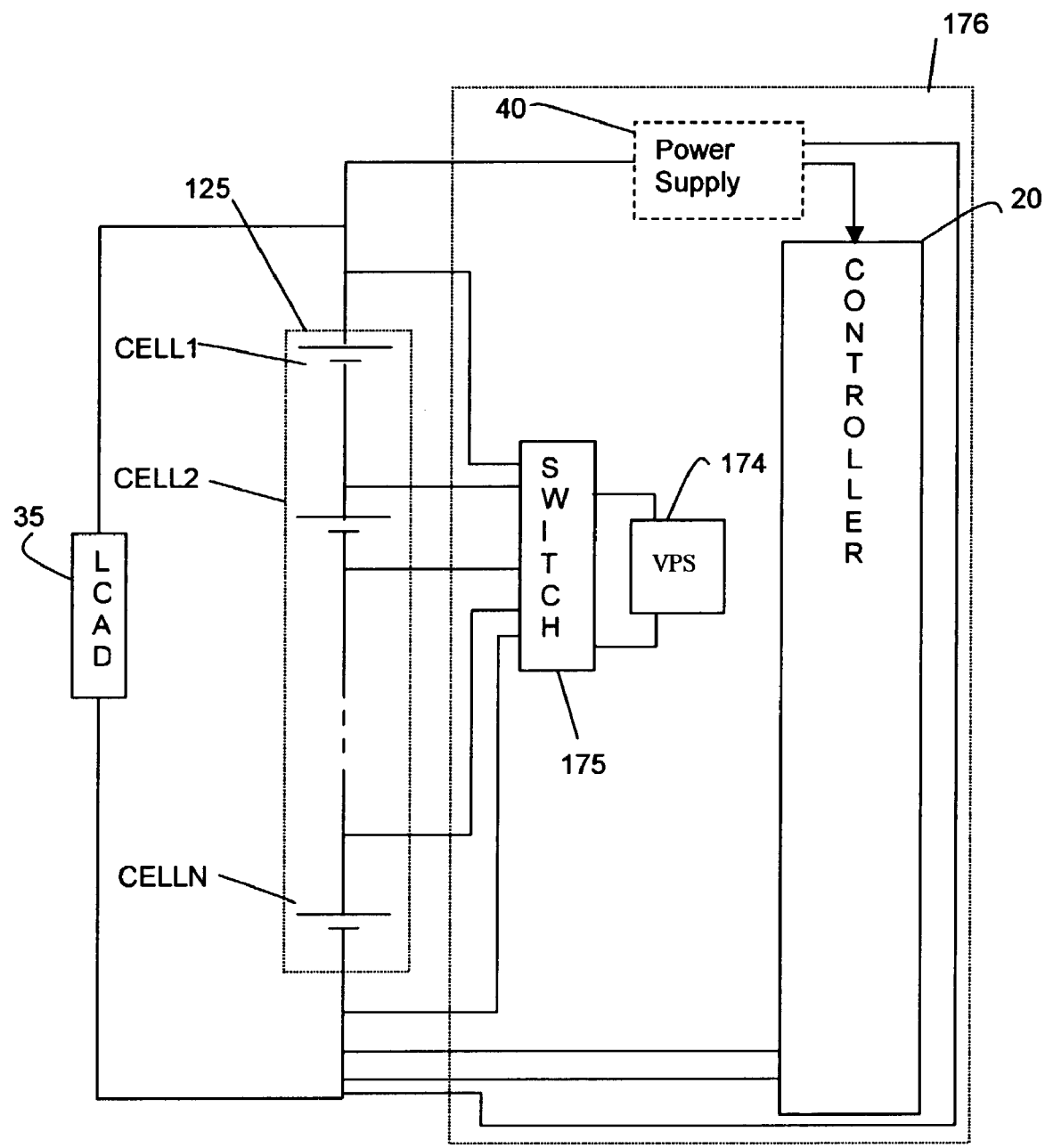
FIG. 4b is a block diagram of a switch means connected to a single variable power supply and a controller for rejuvenating at least one fuel cell in a fuel cell stack.

FIG. 4b differs from FIG. 4a in that a variable power supply 174 is connected to the switch means 175 in a fuel cell management system 176. Furthermore, the power supply 40, coupled to the controller 20, is represented in dashed lines. The dashed lines are intended to illustrate that the variable power supply 174 may function as the sole power supply to the fuel cell management system 176. It should be mentioned that the variable power supply is preferably bipolar but not limited to this type of power supply.

Figure 5:
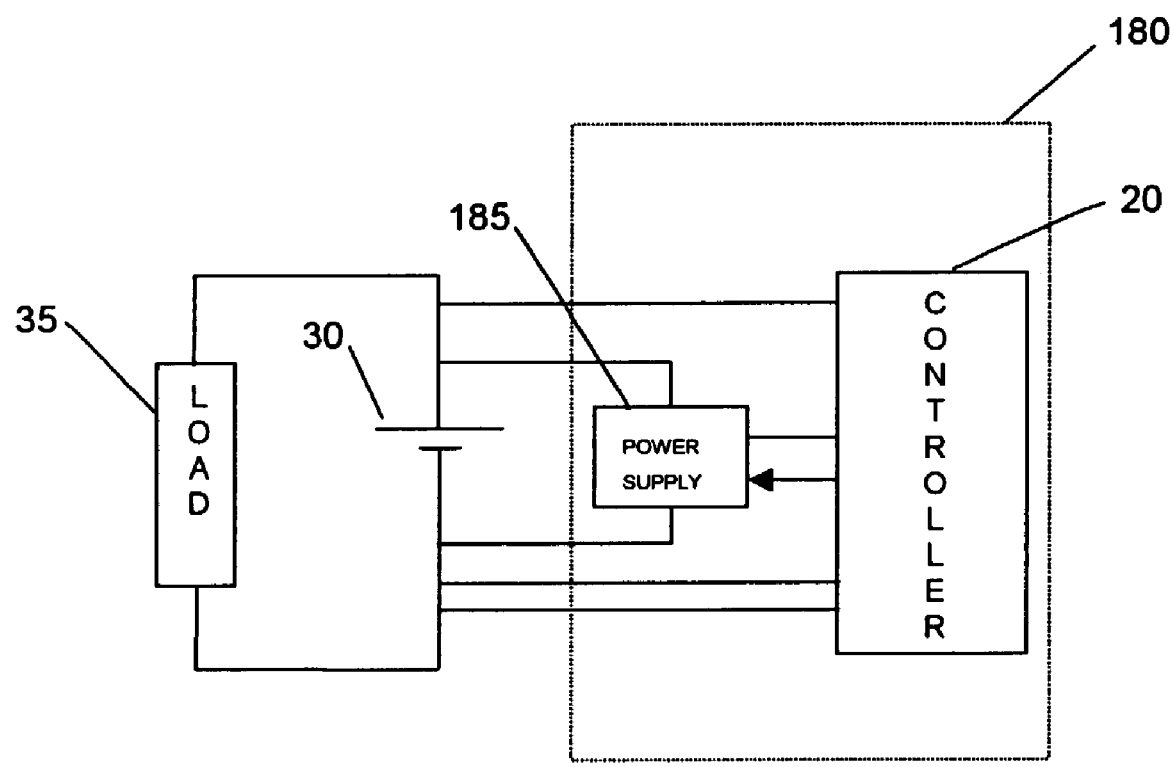
FIG. 5 is a block diagram of the variable power supply and the controller connected across a single fuel cell.

FIG. 5 is a block diagram of a fuel cell management system 180 of the present invention. The fuel cell management system 180 consists of a controller 20 and a variable power supply 185. The controller 20 is connected to the power supply 185. To remove poisons from the individual fuel cell 30, the controller adjusts the output voltage of the variable power supply 185. The output voltage is applied across the fuel cell to provide means for rejuvenating the fuel cell 30. Upon rejuvenating the fuel cell 30, the controller 20 disengages the output voltage of the variable power supply 185.

Figure 6A:
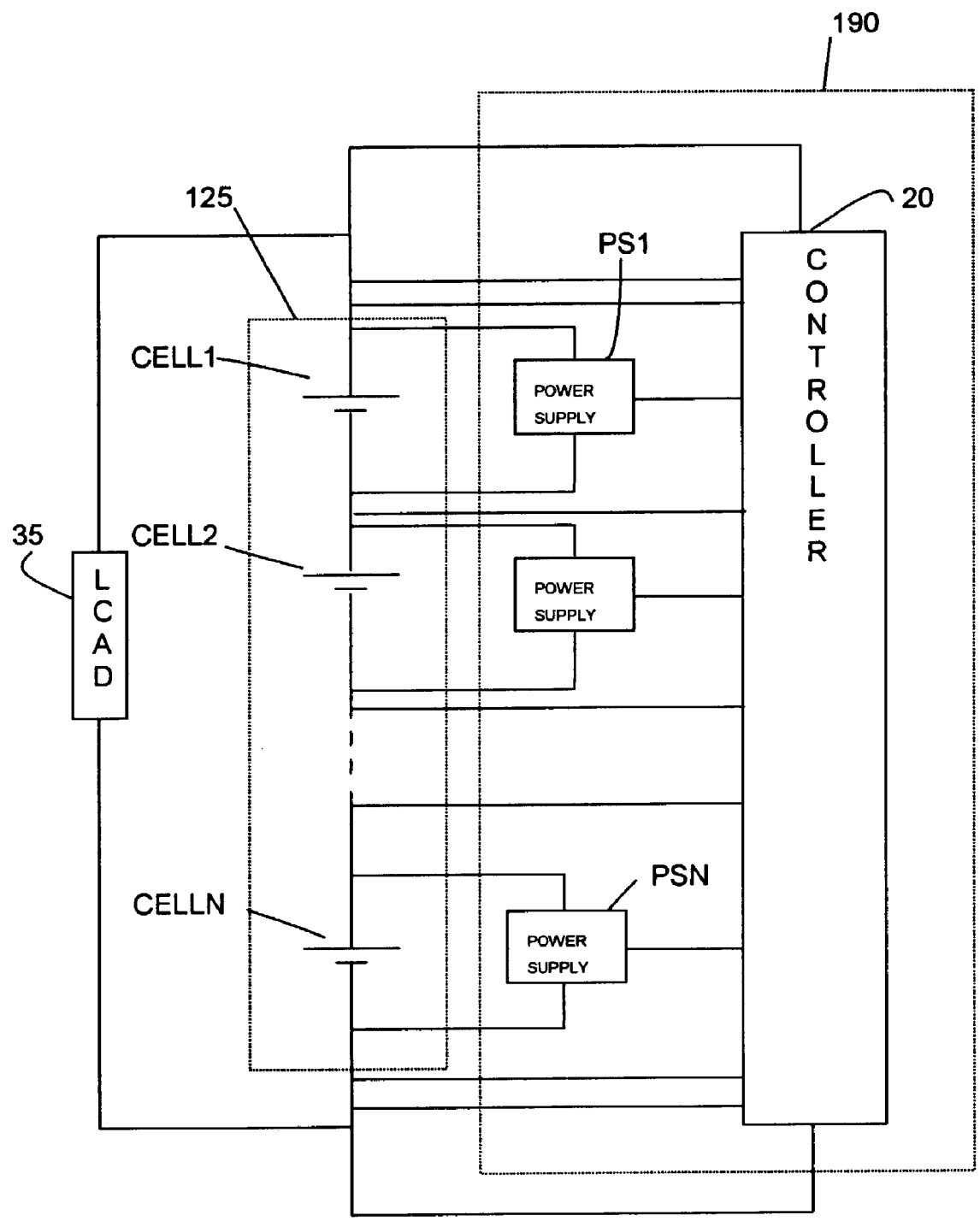
FIG. 6a is a block diagram of a plurality of variable power supplies and a controller connected to a plurality of fuel cells in a fuel cell stack.

FIG. 6a is a block diagram of a fuel cell management system 190 according to a further embodiment of the present invention. The fuel cell management system 190 consists of a controller 20 and a plurality of variable power supplies PS1, PS2, . . . , PSN. The controller 20 utilizes a plurality of variable power supplies PS1, PS2, . . . , PSN to rejuvenate fuel cells CELL1, CELL2, . . . , CELLN in the fuel cell stack 125, either sequentially or in parallel processes. Each of the variable power supplies PS1, PS2, . . . , PSN, provides an output voltage that is adjusted by the controller 20. In the event that one or more of the fuel cells in the fuel cell stack 125 cannot be rejuvenated, the controller 20 can connect a variable power supply to the defective cell and adjust the voltage of the power supply to bypass some or all of the current around the weak or failed cell thereby avoiding failure of the entire fuel cell stack 125 and thereby improving the reliability of the fuel cell system 190 and maximizing the output of the fuel cell stack. In an alternative embodiment, the above processes could be applied to groups of at least two adjacent fuel cells as described earlier.

Figure 6B:
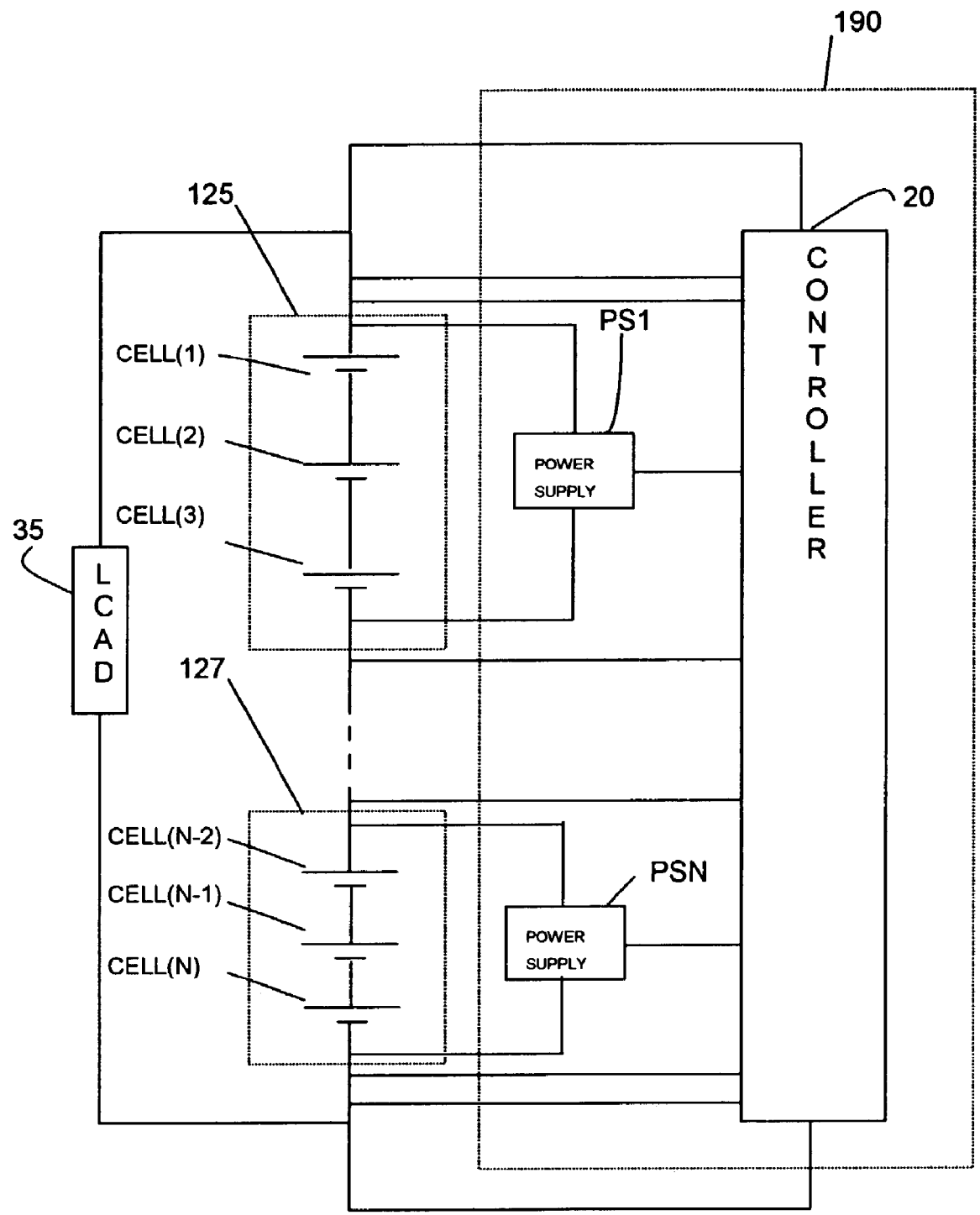
FIG. 6b is a block diagram of a plurality of variable power supplies and a controller connected to a plurality of fuel cells in a fuel cell stack, as in FIG. 6b, in which each variable power supply is coupled across a group of fuel cells in the fuel cell stack.

FIG. 6b is a block diagram of fuel cell management system similar to that of FIG. 6a. In FIG. 6b, each variable power supply is connected to a group of fuel cells in a fuel cell stack. According to the example of FIG. 6b, groups of fuel cells consist of three fuel cells. It should be obvious to the skilled artisan that the finite number of fuel cells within a group may vary based on design constraints, i.e. groups of fuel cells may consist of two fuel cells or up to a convenient number of fuel cells based on the number of fuel cells in the fuel cell stack.

Figure 7A:
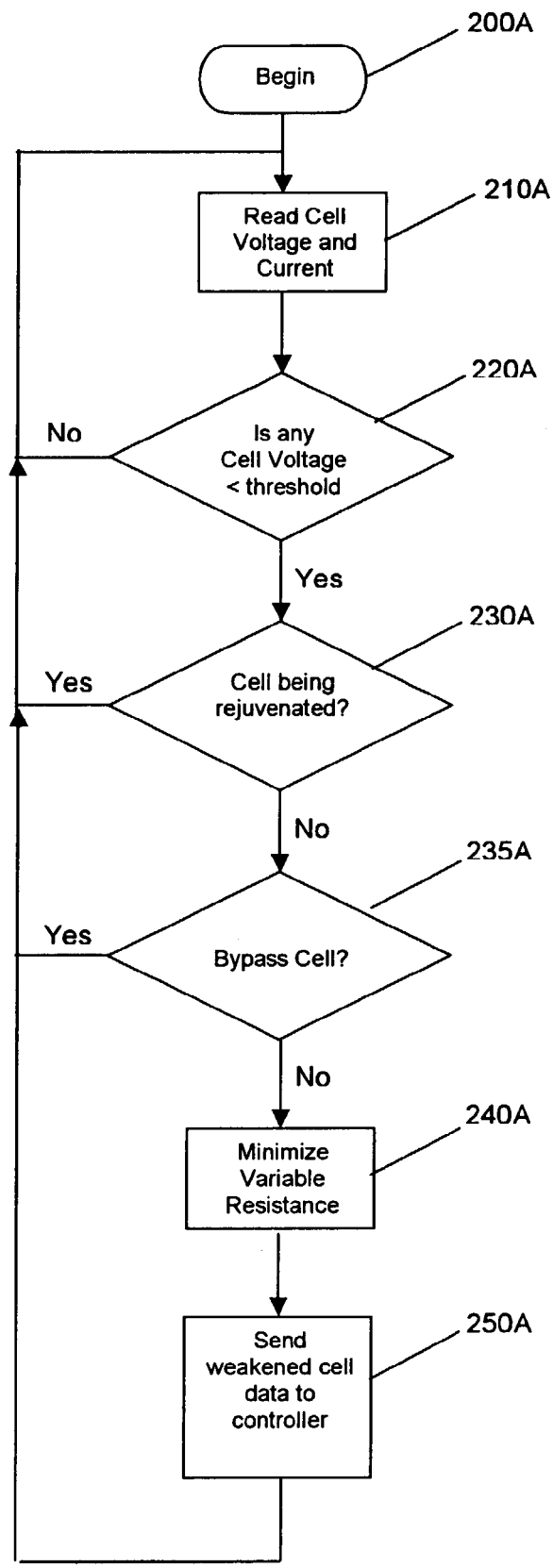
FIG. 7a is a flowchart detailing a method of detecting and rejuvenating a weak fuel cell in a stack of fuel cells by a fuel cell management system utilizing a variable resistive means according to the present invention.

FIG. 7a is a flowchart detailing the steps in a process of detecting and rejuvenating poisoned fuel cells in a fuel cell stack that are deemed weak based on their voltage levels. The process begins at step 200A and is followed by a step 210A that reads an individual cell voltage and current level of the fuel cell stack. The next step 220A determines if the fuel cell voltage is below a predefined threshold based in part on the current level of the fuel cell stack. If the fuel cell voltage is above or equal to that predefined threshold, then the process returns to step 210A and reads in a value of the voltage of the next fuel cell in the stack. If the fuel cell voltage is determined to be below the predefined threshold, then in the next step 230A the controller determines if the cell is being rejuvenated. If cell rejuvenation has already commenced, then the process returns to step 210A and reads the next fuel cell voltage in the stack. It should be mentioned that the fuel cell management may continuously monitor the voltage levels and current levels of the fuel cells and the fuel cell stack respectively. If the cell requires rejuvenation based on the determination in step 230A, then the process must determine whether the cell may be rejuvenated or if the cell should be bypassed through use of a variable resistive means. According to a next step 235A, if the cell requires bypassing then the process returns to step 210A where further steps may be executed by controller to bypass the fuel cell. If the cell does not require bypassing or rejuvenation, then the next step 240A minimizes resistance of the variable resistive means located across the particular cell. In a next step 250A the status of the weakened cell is sent to the controller or any other user interface. A user interface may be utilized in order to alert an operator of the device that a weakened cell has been located and the rejuvenation process has been commenced.

Figure 7B:
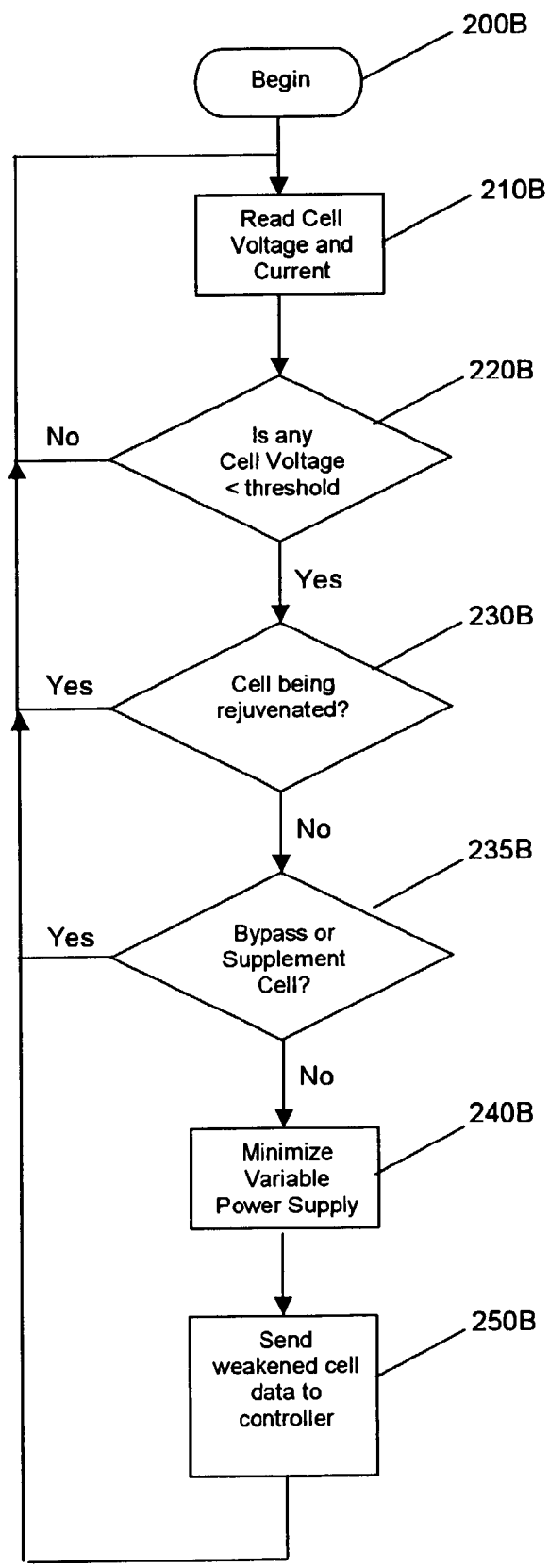
FIG. 7b is a flowchart detailing a method of detecting and rejuvenating a weak fuel cell in a stack of fuel cells by a fuel cell management system utilizing a variable power supply according to the present invention

FIG. 7b is a flowchart detailing the steps in a process of detecting and rejuvenating poisoned fuel cells in a fuel cell stack that are deemed weak based on their voltage levels. FIG. 7b differs from FIG. 7a in that a variable power supply is utilized instead of a variable resistive means. The utilization of a variable power supply is advantageous in that the fuel cell may be bypassed or supplemented by the supper supply to increase the voltage level across the fuel cell. The process begins at step 200B and is followed by a step 210B that reads an individual fuel cell voltage and current level of the fuel cell stack. The next step 220B determines if the fuel cell voltage is below a predefined threshold based in part on the current level of the fuel cell stack. If the fuel cell voltage is above or equal to that predefined threshold, then the process returns to step 210B and reads in a value of the voltage of the next fuel cell in the stack. If the fuel cell voltage is determined to be below the predefined threshold, then in the next step 230B the controller determines if the cell is being rejuvenated. If cell rejuvenation has already commenced, then the process returns to step 210B and reads the next fuel cell voltage in the stack. It should be mentioned that the fuel cell management may continuously monitor the voltage levels and current levels of the fuel cells and the fuel cell stack respectively. If the cell requires rejuvenation based on the determination in step 230B, then the process determines whether the cell may be rejuvenated or if the cell should be bypassed or supplemented through utilizing a variable power supply. According to a next step 235B, if the cell requires bypassing or supplementing then the process returns to step 210B where further steps may be executed by controller to bypass or supplement the fuel cell. If the cell does not require bypassing or rejuvenation, then the next step 240B adjusts the voltage level of the variable power supply located across the particular cell. In a next step 250B, the status of the weakened cell is sent to the controller or any other user interface. A user interface may be utilized in order to alert an operator of the device that a weakened cell has been located and the rejuvenation process has been commenced.

Figure 8:
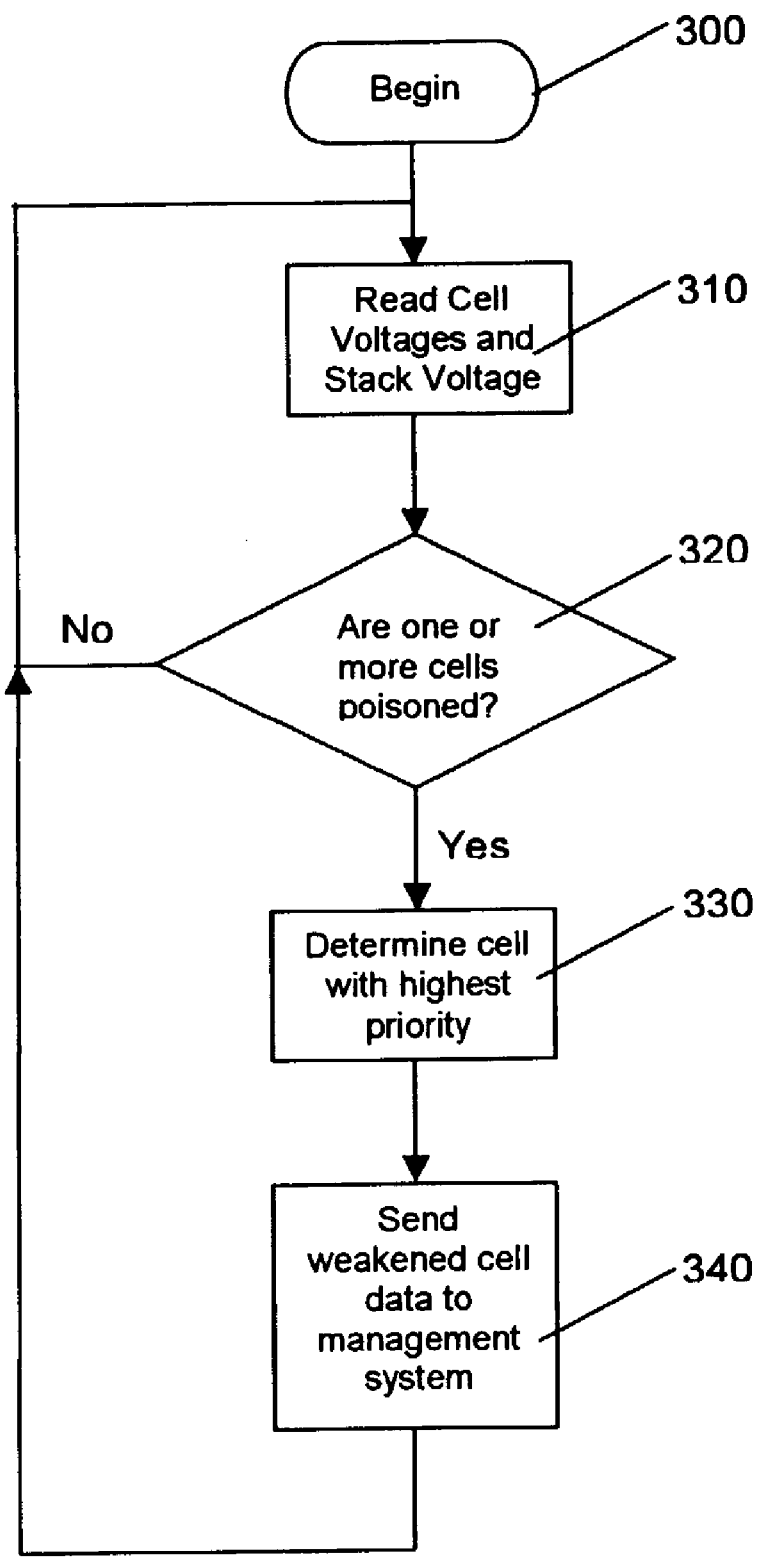
FIG. 8 is a flowchart detailing a method of detecting catalyst poisons in one or more fuel cells in a fuel cell stack and prioritizing the rejuvenating of at least two fuel cells by a fuel cell management system.

FIG. 8 is a flowchart detailing the steps in a process of detecting catalyst poisons in one or more fuel cells in a fuel cell stack and prioritizing the rejuvenation of those fuel cells by a fuel cell management system of the present invention. The process begins with step 300 and in step 310 the fuel cell voltage of each fuel cell in the stack is read in along with the stack voltage. Based on a comparison of the fuel cell voltages and the stack voltage with predefined thresholds, step 320 determines whether one or more fuel cells are poisoned. If the fuel cells are not poisoned, then the process returns to step 310 to read a new set of fuel cell voltages, as well as stack voltage. If one or more fuel cells are poisoned in the stack, then step 330 is followed. In step 330, each fuel cell is prioritized based on predefined criteria explained above. In the case of a single fuel cell being poisoned, the fuel cell is automatically rejuvenated in the next step 340. However, if more than one fuel cell is poisoned then the fuel cell with the highest priority is rejuvenated in step 340. After step 340, the process returns to step 310 to measure continuously, or intermittently, the fuel cell voltages and stack voltage. The process of both FIG. 7 and FIG. 8 is repeated by the controller until it is determined that it is not necessary or the fuel cell stack is not in operation.

Figure 9A:
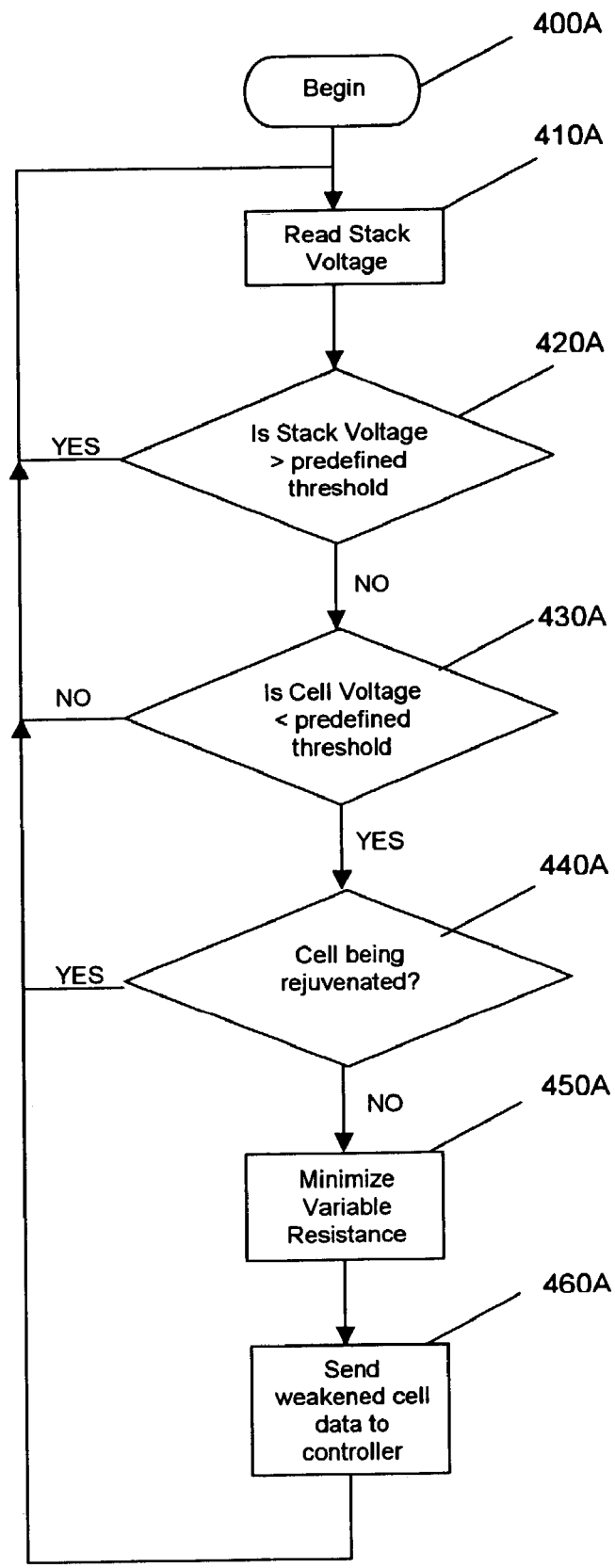
FIG. 9a is a flowchart detailing a method of monitoring the power quality function of a fuel cell stack utilizing a variable resistive means according to the present invention.

FIG. 9a is a flowchart detailing the steps in a process of monitoring the power quality of a fuel cell stack utilizing a variable resistive means. The process begins at step 400A and in the next step 410A the controller reads the voltage level and the current level across the fuel cell stack. In step 420A the fuel cell determines if the stack voltage is above a predefined voltage level of the power quality function. If the stack voltage is above the predefined voltage level then the process returns to step 410A. If the stack voltage is below the predefined voltage level then the process continues with step 430A in which the controller reads in individual fuel cell voltages. The next step 440A determines if the fuel cell voltage is below a predefined threshold. If the fuel cell voltage is above or equal to that predefined threshold, then the process returns to step 410A and reads in a value of the voltage of the next fuel cell in the stack. If the fuel cell voltage is determined to be below the predefined threshold, then in the next step 450A the controller determines if the cell is being rejuvenated. If cell rejuvenation has already commenced, then the process returns to step 410A and reads the next fuel cell voltage in the stack. If the cell is not being rejuvenated, then the next step 460A commences the rejuvenating of the fuel cell by minimizing the variable resistive means located across the particular fuel cell. In step 470A the status of the weakened cell is sent to the controller or any other user interface. According to the process in FIG. 9, as many of the fuel cells are rejuvenated as required in order to maintain the power quality of the fuel cell stack.

Figure 9B:
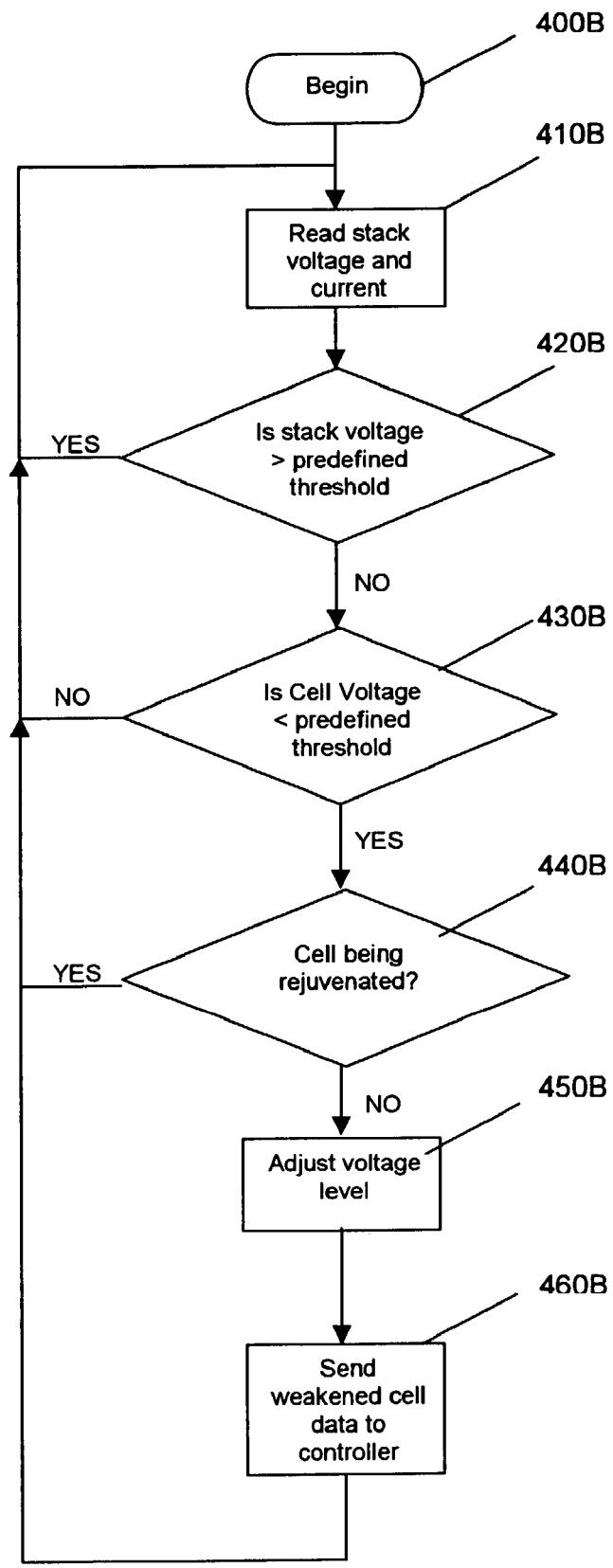
FIG. 9b is a flowchart detailing a method of monitoring the power quality function of a fuel cell stack utilizing a variable power supply according to the present invention.

FIG. 9b is a flowchart detailing a method of monitoring the power quality function of a fuel cell stack which differs from FIG. 9A in that the method utilizes a variable power supply. The process begins at step 400B and in the next step 410B the controller reads the voltage level and current level across the fuel cell stack. In step 420B the fuel cell determines if the stack voltage is above a predefined voltage level of the power quality function. If the stack voltage is above the predefined voltage level then the process returns to step 410B. If the stack voltage is below the predefined voltage level then the process continues with step 430B in which the controller reads in individual fuel cell voltages. The next step 440B determines if the fuel cell voltage is below a predefined threshold. If the fuel cell voltage is above or equal to that predefined threshold, then the process returns to step 410B and reads in a value of the voltage of the next fuel cell in the stack. If the fuel cell voltage is determined to be below the predefined threshold, then in the next step 450B the controller determines if the cell is being rejuvenated. If cell rejuvenation has already commenced, then the process returns to step 410B and reads the next fuel cell voltage in the stack. If the cell is not being rejuvenated, then the next step 460A commences the rejuvenating of the fuel cell by adjusting the voltage level across the particular fuel cell. In step 470B the status of the weakened cell is sent to the controller or any other user interface. According to the process in FIGS. 9a and 9b, as many of the fuel cells are rejuvenated as required in order to maintain the power quality of the fuel cell stack.

According to the present invention, the processes described in FIGS. 7a, 7B, 8, 9a, and 9b may be implemented for rejuvenation of entire fuel cells or more specifically, rejuvenation of the anode or cathode portion of the fuel cells. As such, the controller would measure the voltage levels across the fuel cell to determine whether rejuvenation is required.

Figure 10:
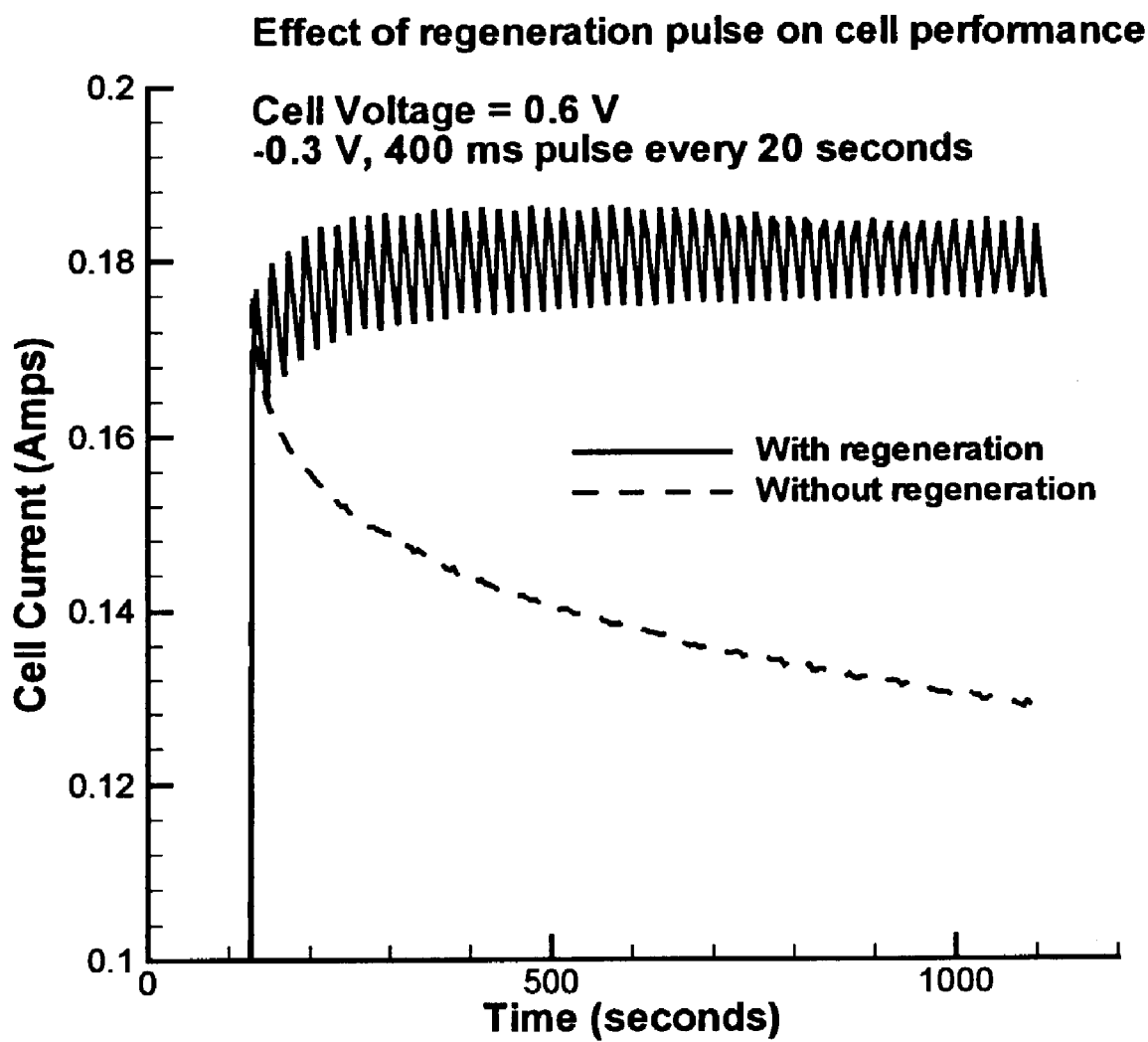
FIG. 10 is an illustration of an experimental use of the present invention where the variable resistive means, or the variable power supply, is periodically engaged by the fuel cell management system.

FIG. 10 illustrates the experimental use of the present invention for the purposes of rejuvenating of the fuel cell, or a group of cells. By periodically adjusting the voltage across a particular fuel cell, or group of fuel cells, rejuvenation occurs. The graph illustrates the fuel cell current over time for fuel cells where periodic rejuvenation has occurred. For cell rejuvenation, the cell voltage has been reduced to −0.3 Volts for 400 milliseconds every 20 seconds. The graph further illustrates the fuel cell current over time for a cell not having undergone the rejuvenation process. In both cases the cell voltage has been held constant at 0.6 Volts and hydrogen containing 100 parts per million of carbon monoxide has been used as the fuel. A comparison of these experimental results illustrates that the output of the fuel cell with periodic pulsing is about 50% higher after 20 minutes of operation than that of a cell without the use of a rejuvenation pulse. The applied pulse may be defined by various parameters that are determined based on the level of catalyst poison. The parameters defining the length and shape of the applied pulse may be a voltage level, a voltage level range, a given period in time for the pulse, and the periodicity of the pulse, or any other suitable parameter.

Figure 11:
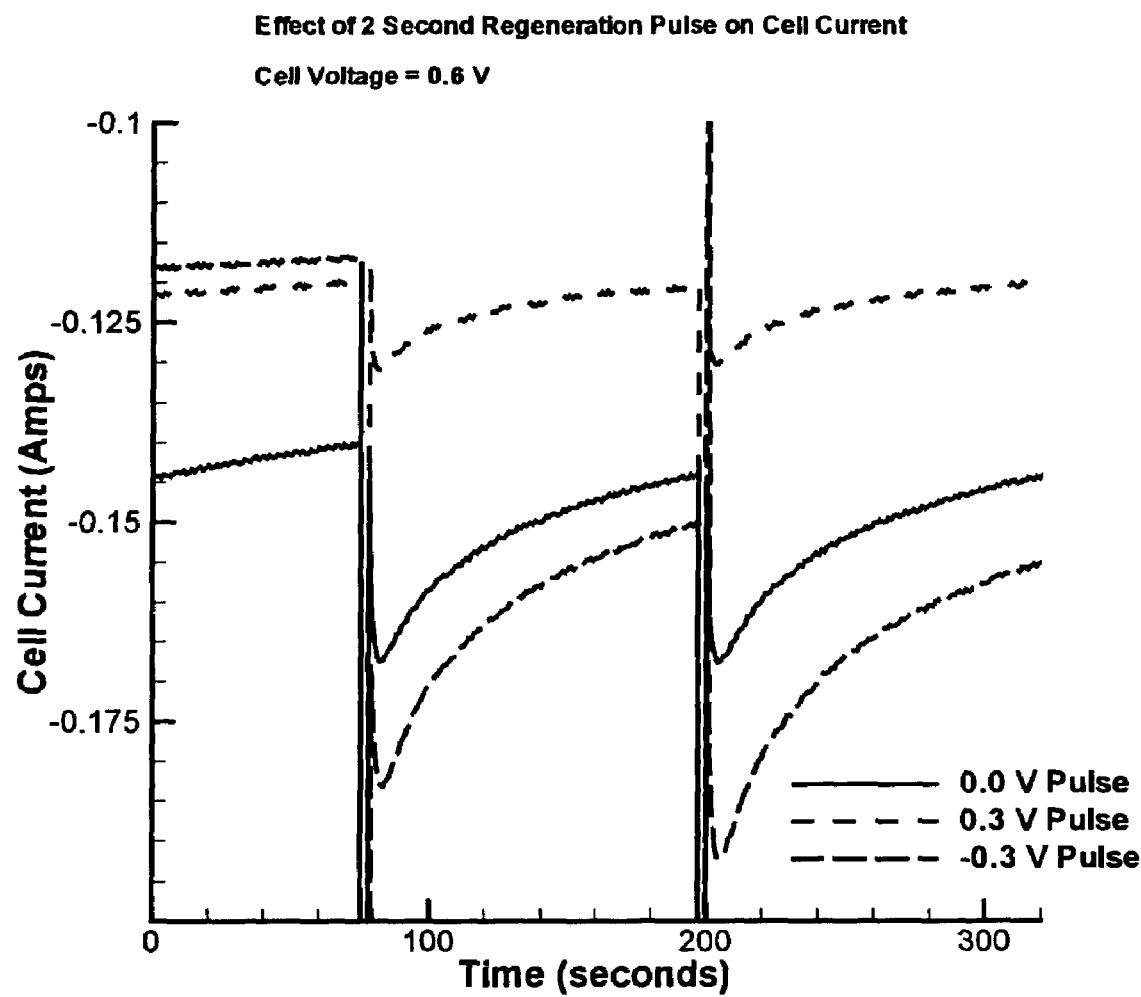
FIG. 11 is an illustration of the effects resultant from adjusting the voltage limits of a voltage pulse on fuel cell power output.

FIG. 11 illustrates resultant from adjusting the voltage limits of a voltage pulse on fuel cell power output. More specifically, FIG. 11 illustrates the change in output following a regeneration pulse. The data shows that the cell is poisoned over several minutes. In this experiment, a 2 second pulse was applied. Other experiments have shown that a much shorter pulse, or longer pulse, is equally effective (eg 200 ms or less).

In FIG. 11, the cell voltage has been reduced to the indicated voltage values for a period of 2 seconds for cell rejuvenation. Following the regeneration pulse, the cell voltage has been held constant at 0.6 Volts. Hydrogen containing 100 parts per million of carbon monoxide has been used as the fuel. The results indicate that the regeneration process is more effective when at lower potentials. In general, it can be expected that the optimum regeneration voltage and time will be dependent of the particular poison that needs to be removed from the cell.

Figure 12:
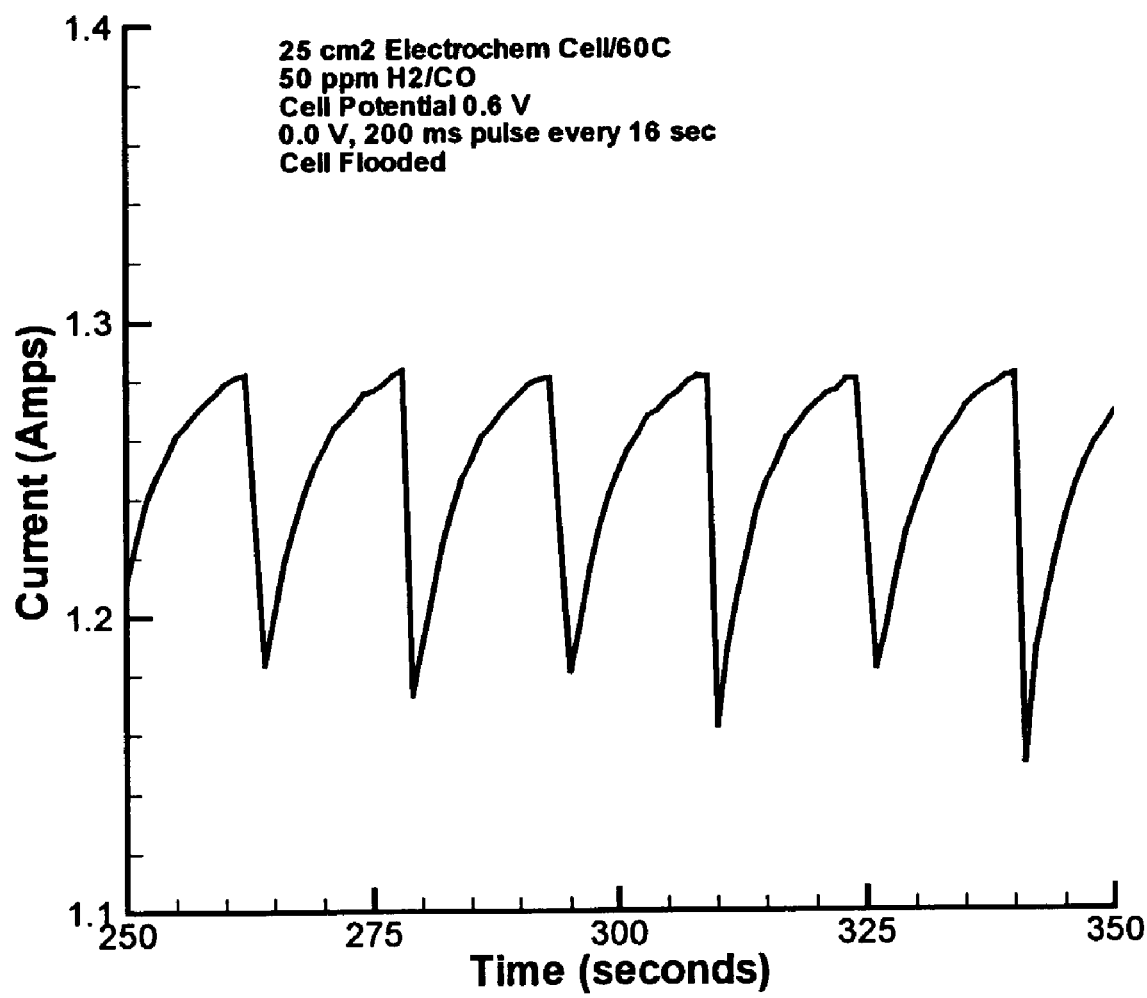
FIG. 12 is an illustration of the effects resultant from a flooded cell in a fuel cell stack.

FIG. 12 is an illustration of the effects resultant from a flooded cell in a fuel cell stack. The data obtained indicates that the present invention may be useful in determining cell condition. FIG. 12 illustrates the following: 1. the response of a cell to a pulse when it is operating at high potential (0.8 V) and the cathode is being poisoned with Pt—OH (Uribe and Donahue situation); and 2. the response of a cell whose performance is being limited by cathode flooding.

Figure 13:
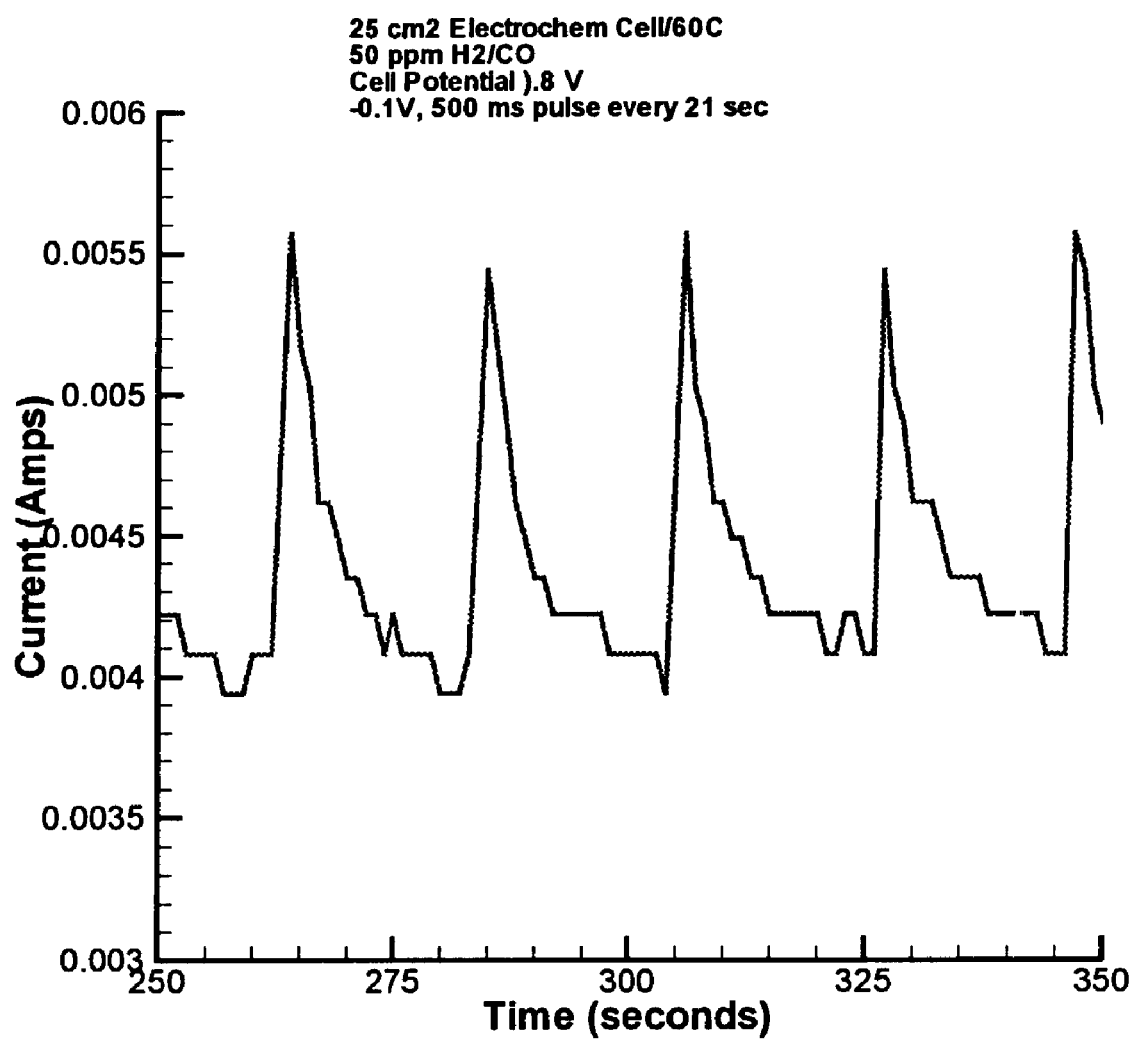
FIG. 13 is an illustration of the effects resultant from cathode regeneration on a fuel cell in fuel cell stack.

FIG. 13 is an illustration of the effects resultant from cathode regeneration on a fuel cell in fuel cell stack. As illustrated on the graph, when the cell is poisoned the performance is increased whereas when the cell is flooded it is decreased. An advantage of the present invention is that the fuel cell voltages and currents may be continuously monitored as well. This information is useful in overall management of the fuel cell stack.

Also in FIG. 13, the cell performance is limited by CO poisoning to illustrate the effects of the FCHM on removal of poisons. If cell is limited by some other process (e.g. flooding), the behaviour would be different. Accordingly, the FCHM might provide information that would help to diagnose the state of the cell and can be used to improve performance in certain situations (e.g. when the cell is being poisoned).

It should be understood that the methods and devices of the present invention enable the fuel cell stack to provide a high level of performance where a high level of contaminants is found in individual fuel cells, as well as groups of fuel cells, in the fuel cell stack.

It should be further understood that the preferred embodiments mentioned here are merely illustrative of the present invention. Numerous variations in design and use of the present invention may be contemplated in view of the following claims without straying from the intended scope and field of the invention herein disclosed.

What is claimed is:

1. A device for performing an operation on an individual fuel cell while the fuel cell is operational, the device comprising:
    a variable resistive means coupled to the fuel cell; and
    a controller for adjusting the variable resistive means, the controller having measuring means for determining a voltage level and a current level of the fuel cell, the controller adjusting the variable resistive means based on the voltage level and the current level of the fuel cell.

2. A device for performing an operation on an individual fuel cell in a fuel cell stack, the fuel cell stack having a plurality of fuel cells coupled to each other in series, the device comprising:
    a controller having measuring means for determining a voltage level across each fuel cell and a current level across the fuel cell stack;

a plurality of variable resistive means for providing a variable resistive value, each variable resistive means coupled to one of the plurality of fuel cells, and each variable resistive means connected to the controller; and a power supply coupled to the controller; wherein the controller adjusts the variable resistive value to change the voltage level across a particular fuel cell.

3. A device as defined in claim 2, wherein the power supply derives power from the fuel cell stack.

4. A device as defined in claim 1,2, or 3, wherein the operation is a rejuvenating operation.

5. A device as defined in claim 1,2, or 3, wherein the operation is a bypass operation.

6. A device for performing an operation on an individual fuel cell in a fuel cell stack, the fuel cell stack having a plurality of fuel cells coupled to each other in series, the device comprising:

a controller having measuring means for determining a voltage level and a current level across the fuel cell stack;

a variable resistive means controlled by the controller; and a switch means connected across each of the plurality of fuel cells, and connected to both the controller and the variable resistive means;

wherein the controller adjusts a variable resistive value of the variable resistive means to change the voltage level across a particular fuel cell based on the voltage level and the current level, and wherein the controller enables the switch to increase current through the particular fuel cell.

7. A device as defined in claim 6, wherein the operation is a rejuvenating operation.

8. A device as defined in claim 6, wherein the operation is a bypass operation.

9. A method of rejuvenating an individual fuel cell, including the steps of:

a) coupling a variable resistive means across the fuel cell:

b) providing a voltage source to the variable resistive means;

c) measuring a voltage level across the fuel cell;

d) measuring a current level across the fuel cell; and e) controlling the variable resistive means based on the voltage level and the current level measured in step c) and d).

10. A method of bypassing an individual fuel cell in a stack of fuel cells, including the steps of:

a) coupling a variable resistive means across the fuel cell;

b) providing a voltage source to the variable resistive means;

c) measuring a voltage level across the fuel cell; and d) controlling the variable resistive means based on the voltage level measured in step c) to bypass current through the variable resistive means.

11. A method of detecting and rejuvenating a weak fuel cell in a stack of fuel cells by a fuel cell management system, including the steps of:

a) selecting a fuel cell for detection;

b) measuring a voltage level of the selected fuel cell;

c) comparing the voltage level with a predefined voltage level threshold;

d) if the voltage level is less than the predefined voltage level threshold, adjusting a variable resistive value across the fuel cell to increase the current through the fuel cell, and output the voltage level measured in step b) to update the fuel cell management system; and e) if the voltage level is at least equal to the predefined voltage level threshold, repeating steps a) through e).

12. A method of detecting catalyst poisons in at least two fuel cells in a fuel cell stack and prioritizing the rejuvenation of at least two fuel cells by a fuel cell management system, including the steps of:

a) measuring a voltage level across each of the at least two fuel cells;

b) measuring a voltage level across the fuel cell stack;

c) detecting a level of catalyst poisons in at least two fuel cells based on the voltage level measured in step a) and the voltage level measured in step b);

d) prioritizing each of the at least two fuel cells based on the level of catalyst poisons determined in step c);

e) for a highest priority level, adjusting a variable resistive value across a first fuel cell having the highest priority level, and updating the level of catalyst poisons in the first cell;

f) if the two fuel cells have been prioritized in step d), adjusting a variable resistive value across a second fuel cell; and g) if at least two fuel cells have been prioritized in step d), repeating step c) through g).

13. A method of detecting and rejuvenating a weak fuel cell in a stack of fuel cells by a fuel cell management system, including the steps of:

a) selecting a fuel cell for detection;

b) measuring a voltage level of the selected fuel cell;

c) comparing the voltage level with a predefined voltage level threshold;

d) if the voltage level is less than the predefined voltage level threshold, applying a voltage level value across the fuel cell to increase the current through the fuel cell, and output the voltage level measured in step b) to update the fuel cell management system; and e) if the voltage level is at least equal to the predefined voltage level threshold, repeating steps a) through e).

14. A method of detecting catalyst poisons in at least two fuel cells in a fuel cell stack and prioritizing the rejuvenation of at least two fuel cells by a fuel cell management system, including the steps of:

a) measuring a voltage level across each of the at least two fuel cells;

b) measuring a voltage level across the fuel cell stack;

c) detecting a level of catalyst poisons in at least two fuel cells based on the voltage level measured in step a) and the voltage level measured in step b);

d) prioritizing each of the at least two fuel cells based on the level of catalyst poisons determined in step c);

e) for a highest priority level, applying a voltage level across a first fuel cell having the highest priority level, and updating the level of catalyst poisons in the first cell;

f) if the two fuel cells have been prioritized in step d), applying a voltage level value across a second fuel cell; and g) if at least two fuel cells have been prioritized in step d), repeating step c) through g).

15. A method of detecting catalyst poisons and rejuvenating a weak fuel cell in a stack of fuel cells by a fuel cell management system, including the steps of:

a) measuring a stack voltage level;

b) comparing the stack voltage level with a predefined stack voltage level;

c) if the stack voltage level is less than the predefined stack voltage level, executing the steps of:
   c1) selecting a fuel cell for detection;
   c2) measuring a cell voltage level of the fuel cell;
   c3) comparing the cell voltage level with a predefined cell voltage level threshold;
   c4) if the voltage level is less than the predefined cell voltage level threshold, adjusting a variable resistive value across the fuel cell, and outputting cell voltage level measured in step to update the fuel cell management system;
   c5) if the voltage level is at least equal to the predefined voltage level threshold, repeating steps a) through c); and
d) if the stack voltage level is at least equal to the predefined voltage, repeating steps a) through d).

16. A method of detecting catalyst poisons and rejuvenating a weak fuel cell in a stack of fuel cells by a fuel cell management system, including the steps of:
a) measuring a stack voltage level;
b) comparing the stack voltage level with a predefined stack voltage level;
c) if the stack voltage level is less than the predefined stack voltage level, executing the steps of:
   c1) selecting a fuel cell for detection;
   c2) measuring a cell voltage level of the fuel cell;
   c3) comparing the cell voltage level with a predefined cell voltage level threshold;
   c4) if the voltage level is less than the predefined cell voltage level threshold, applying a voltage level across the fuel cell, and outputting cell voltage level measured in step to update the fuel cell management system;
   c5) if the voltage level is at least equal to the predefined voltage level threshold, repeating steps a) through c); and
d) if the stack voltage level is at least equal to the predefined voltage, repeating steps a) through d).

17. A method of replacing a weak fuel cell in a stack of fuel cells detected by a fuel cell management system, including the steps of:
a) selecting a fuel cell for detection;
b) measuring a voltage level of the selected fuel cell and a current level of the stack of fuel cells;
c) comparing the voltage level with a predefined voltage level threshold; and
d) if the voltage level is less than the predefined voltage level threshold, adjusting a variable resistive value across the fuel cell to bypass current around the fuel cell.

18. A method of replacing a weak fuel cell in a stack of fuel cells detected by a fuel cell management system, including the steps of:
a) selecting a fuel cell for detection;
b) measuring a voltage level of the selected fuel cell;
c) comparing the voltage level with a predefined voltage level threshold;
d) if the voltage level is less than the predefined voltage level threshold, adjusting a variable resistive value across the fuel cell to bypass current around the fuel cell, and output the voltage level measured in step b) to update the fuel cell management system; and
e) if the voltage is at least equal to the predefined voltage level threshold, repeating steps a) through c).

19. A device for performing an operation on an individual fuel cell in a fuel cell stack, the fuel cell stack having a plurality of fuel cells coupled to each other in series, the plurality of fuel cells including a subset of at least one fuel cell within the plurality of fuel cells, the device comprising:
   a controller having measuring means for determining a voltage level and a current level across the subset of at least one fuel cell;
   a variable resistive means controlled by the controller; and
   a switch means connected across the subset of at least one fuel cell, and connected to both the controller and the variable resistive means;
   whereby the controller adjusts the variable resistive value to change the voltage level across the subset of at least one fuel cell based on the voltage level and the current level, and the controller enables the switch to increase current through a particular fuel cell of the subset of at least one fuel cell.

20. A device for performing an operation on at least one individual fuel cell in a fuel cell stack, the fuel cell stack having a plurality of fuel cells coupled to each other in series, the plurality of fuel cells including a subset of at least one fuel cell within the plurality of fuel cells, the device comprising:
   a controller having measuring means for determining a voltage level and a current level across the subset of at least one fuel cell;
   a variable resistive means controlled by the controller; and
   a switch means connected across the subset of at least one fuel cell, and connected to both the controller and the variable resistive means;
   whereby the controller adjusts the variable resistive value to adjust the voltage level across the subset of at least one fuel cell based on the voltage level and the current level, and the controller enables the switch to increase current through at least two fuel cells of the subset of at least one fuel cell.

21. A device for performing an operation on at least two fuel cells in a fuel cell stack, the fuel cell stack having a plurality of fuel cells coupled to each other in series, the device comprising:
   a controller having measuring means for determining a voltage level and a current level across the fuel cell stack;
   a variable resistive means controlled by the controller; and
   a switch means connected across each of the plurality of fuel cells, and connected to both the controller and the variable resistive means;
   whereby the controller adjusts a variable resistive value of the variable resistive means to change a fuel cell voltage level across each of the at least two fuel cells based on the voltage level and the current level, and the controller simultaneously enables the switch increase current through each of the at least two fuel cells.

22. A device for performing an operation on at least two fuel cells in a fuel cell stack, the fuel cell stack having a plurality of fuel cells coupled to each other in series, the device comprising:
   a controller having measuring means for determining a voltage level and a current level across the fuel cell stack;
   a plurality of variable resistive means controlled by the controller; and
   a switch means connected across each of the plurality of fuel cells, and connected to both the controller and the plurality of variable resistive means;

whereby the controller adjusts at least two variable resistive values corresponding to at least two variable resistive means, of the plurality of variable resistive means, to change the voltage level across at least two fuel cells respectively, based on the voltage level and the current level, and the controller simultaneously enables the switch to increase current through each of the at least two fuel cells.

23. A device as in claim 19, 20, 21 or 22, wherein the operation is a rejuvenating operation.

24. A device as in claim 19, 20, 21 or 22, wherein the operation is a bypass operation.

25. A method of detecting catalyst poisons in at least two fuel cells in a fuel cell stack and prioritizing the rejuvenation of at least two fuel cells by a fuel cell management system, including the steps of:
   a) measuring a fuel cell voltage level across each of the at least two fuel cells;
   b) measuring a stack voltage level and a current level across the fuel cell stack;
   c) detecting a level of catalyst poisons in at least two fuel cells based on the fuel cell voltage level measured in step a) and the stack voltage level measured in step b);
   d) prioritizing each of the at least two fuel cells based on the level of catalyst poisons determined in step c); and
   e) for a given priority level, adjusting the fuel cell voltage level across at least one fuel cell of the at least two fuel cells, by applying a pulse across the at least one fuel cell, the pulse being defined by at least one parameter, the at least one parameter being determined based on the level of catalyst poisons.

26. A method as defined in claim 25, wherein the at least one parameter is a voltage level.

27. A method as defined in claim 25, wherein the at least one parameter is a given period in time for each pulse.

28. A method as defined in claim 26, wherein the at least one parameter is a given period in time for the pulse.

29. A method as defined in claim 26, wherein the at least one parameter is a given period in time for the pulse.

30. A method as defined in claim 25, wherein the pulse is periodically applied.

31. A method as defined in claim 26, wherein the pulse is periodically applied.

32. A method as defined in claim 27, wherein the pulse is periodically applied.

33. A method of detecting catalyst poisons in a group of at least two fuel cells in a fuel cell stack and prioritizing the rejuvenation of the group of at least two fuel cells by a fuel cell management system, including the steps of:
   a) measuring a fuel cell voltage level across the group of at least two fuel cells;
   b) measuring a stack voltage level and a current level across the fuel cell stack;
   c) detecting a level of catalyst poisons in the group of at least two fuel cells based on the fuel cell voltage level and the current level measured in step a) and the stack voltage level and the current level measured in step b); and
   d) adjusting a variable resistive value of the resistive means connected across the group of at least two fuel cells.

34. A method of detecting catalyst poisons in a group of at least two fuel cells in a fuel cell stack and prioritizing the rejuvenation of the group of at least two fuel cells by a fuel cell management system, including the steps of:
   a) measuring a fuel cell voltage level across the group of at least two fuel cells;
   b) measuring a stack voltage level and a current level across the fuel cell stack;
   c) detecting a level of catalyst poisons in the group of at least two fuel cells based on the fuel cell voltage level measured in step a) and the stack voltage level and the current level measured in step b); and
   d) adjusting a variable resistive value of the resistive means connected across the group of at least two fuel cells to bypass current through the resistive means.

35. A method of detecting catalyst poisons in a group of at least two fuel cells in a fuel cell stack and prioritizing the rejuvenation of the group of at least two fuel cells by a fuel cell management system, including the steps of:
   a) measuring a fuel cell voltage level across the group of at least two fuel cells;
   b) measuring a stack voltage level and a current level across the fuel cell stack;
   c) detecting a level of catalyst poisons in the group of at least two fuel cells based on the fuel cell voltage level measured in step a) and the stack voltage level and current level measured in step b); and
   d) adjusting a voltage level applied across the group of at least two fuel cells by applying a pulse across the group at least two fuel cells, the pulse being defined by at least one parameter, the at least one parameter being determined based on the level of catalyst poisons.

36. A method as defined in claim 35, wherein the at least one parameter is a voltage level.

37. A method as defined in claim 35, wherein the at least one parameter is a voltage level range.

38. A method as defined in claim 35, wherein the at least one parameter is a given period in time for the pulse.

39. A method as defined in claim 35, wherein the pulse is periodically applied.

40. A device for rejuvenating at least two fuel cells while the fuel cell is operational, the device comprising:
   a variable resistive means coupled to the at least two fuel cells; and
   a controller for adjusting the variable resistive means, the controller having measuring means for determining a voltage level and a current level of the at least two fuel cells, the controller adjusting the variable resistive means based on the voltage level and the current level of the at least two fuel cells, and the controller deriving power from a power supply.

41. A device for performing an operation on an individual fuel cell while the fuel cell is operational in a fuel cell stack, the device comprising:
   a variable resistive means coupled to the fuel cell; and
   a controller for adjusting the variable resistive means, the controller having measuring means for determining a fuel cell voltage level and a current level of the fuel cell stack, the controller adjusting the variable resistive means based on the voltage level and the current level of the fuel cell; and
   means for determining a limiting process within a fuel cell thus enabling an optimization of a performance level of the fuel cell stack.

* * * * *